United States Patent
Hirose et al.

(10) Patent No.: US 9,996,152 B2
(45) Date of Patent: Jun. 12, 2018

(54) INTERFACE APPARATUS

(71) Applicants: TOKYO INSTITUTE OF TECHNOLOGY, Tokyo (JP); SONY COMPUTER ENTERTAINMENT INC., Tokyo (JP)

(72) Inventors: Shigeo Hirose, Tokyo (JP); Hiroaki Ishida, Tokyo (JP); Takeshi Yamagishi, Tokyo (JP); Tomokazu Kake, Tokyo (JP); Keiji Togawa, Tokyo (JP)

(73) Assignees: TOKYO INSTITUTE OF TECHNOLOGY, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 87 days.

(21) Appl. No.: 14/908,553

(22) PCT Filed: Aug. 2, 2013

(86) PCT No.: PCT/JP2013/071069
§ 371 (c)(1),
(2) Date: Jan. 29, 2016

(87) PCT Pub. No.: WO2015/015651
PCT Pub. Date: Feb. 5, 2015

(65) Prior Publication Data
US 2016/0162021 A1 Jun. 9, 2016

(51) Int. Cl.
*G06F 3/01* (2006.01)
*A63F 9/24* (2006.01)
*A63F 13/212* (2014.01)
*A63F 13/24* (2014.01)
*A63F 13/285* (2014.01)

(52) U.S. Cl.
CPC .............. *G06F 3/014* (2013.01); *A63F 9/24* (2013.01); *A63F 13/212* (2014.09); *A63F 13/24* (2014.09);
(Continued)

(58) Field of Classification Search
CPC .......... G06F 3/011; G06F 3/014; G06F 3/016; A63F 13/212; A63F 13/285; A63F 13/24; A63F 9/24; A63F 2009/2447
See application file for complete search history.

(56) References Cited

U.S. PATENT DOCUMENTS 7,846,177 B2 * 12/2010 Carpenter .......... A61B 17/2909
606/205
2003/0025723 A1 * 2/2003 Olien ...................... G06F 3/016
715/701
(Continued)

FOREIGN PATENT DOCUMENTS

CN  1504358 A  6/2004
CN  1531704 A  9/2004
(Continued)

OTHER PUBLICATIONS

English Translation of Written Opinion of the International Searching Authority for PCT/JP2013/071069 accompanied with PCT/IB/338 and PCT/IB/373 dated Feb. 11, 2016.
(Continued)

*Primary Examiner* — Amare Mengistu
*Assistant Examiner* — Jennifer Zubajlo
(74) *Attorney, Agent, or Firm* — HEA Law PLLC

(57) ABSTRACT

In an interface apparatus for presenting a force sense at a remote place or in a virtual space to a user, the number of motors for exerting force upon fingers of the user is decreased. The interface apparatus includes a first arm and a second arm for being attached to the thumb and a finger other than the thumb, respectively. A motor includes a motor main body supported for rotation, and a rotary shaft that relatively rotates with respect to the motor main body. The rotary shaft is connected to the second arm. The motor main body is connected to the first arm so as to impart rotation thereof to the first arm.

4 Claims, 22 Drawing Sheets

(52) U.S. Cl.
CPC ............ *A63F 13/285* (2014.09); *G06F 3/011* (2013.01); *G06F 3/016* (2013.01); *A63F 2009/2447* (2013.01)

(56) References Cited

U.S. PATENT DOCUMENTS

2007/0105673 A1    5/2007  Gosselin et al.
2015/0335347 A1*  11/2015  Hirai .............. A61B 17/320092
                                                      606/169

FOREIGN PATENT DOCUMENTS

| JP | H09-019879 A | 1/1997 |
| JP | 2000-218041 A | 8/2000 |
| JP | 2002-182817 A | 6/2002 |
| JP | 2003225883 A * | 8/2003 |
| JP | 2004-157621 A | 6/2004 |
| JP | 2004-536409 A | 12/2004 |
| JP | 2007-520793 A | 7/2007 |
| JP | 2008-173186 A | 7/2008 |
| JP | 2008-209689 A | 9/2008 |

OTHER PUBLICATIONS

English Translation of International Search Report for PCT/JP2013/071069 dated Oct. 29, 2013.
Office Action dated Nov. 16, 2017, for corresponding CN Patent Application No. 201380078702.5 and English translation thereof.

* cited by examiner

FIG. 4
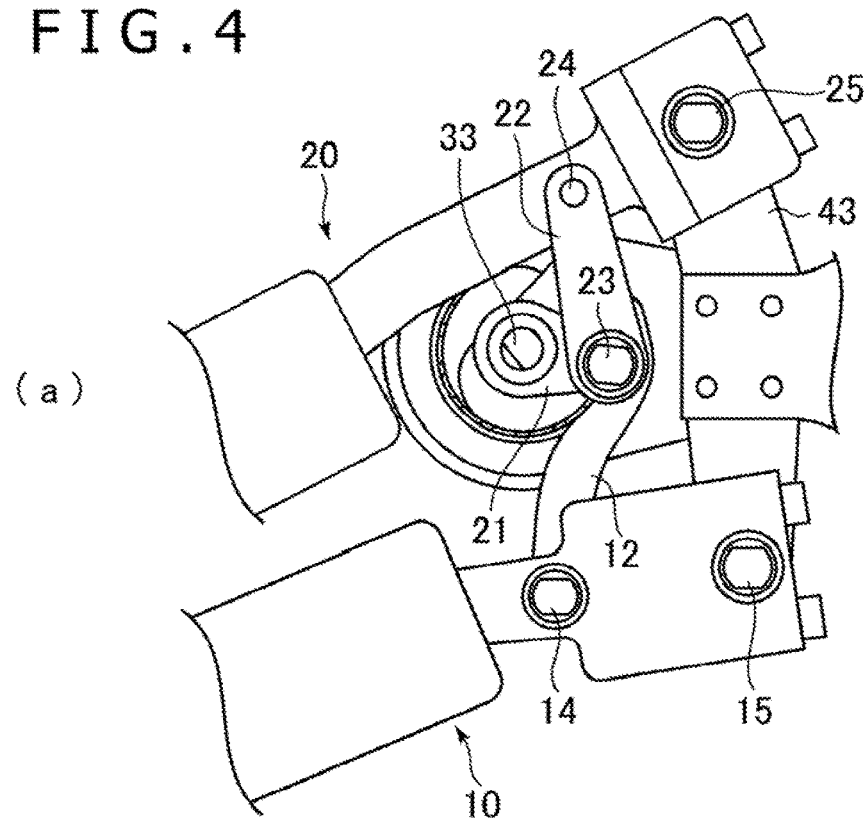
(a)
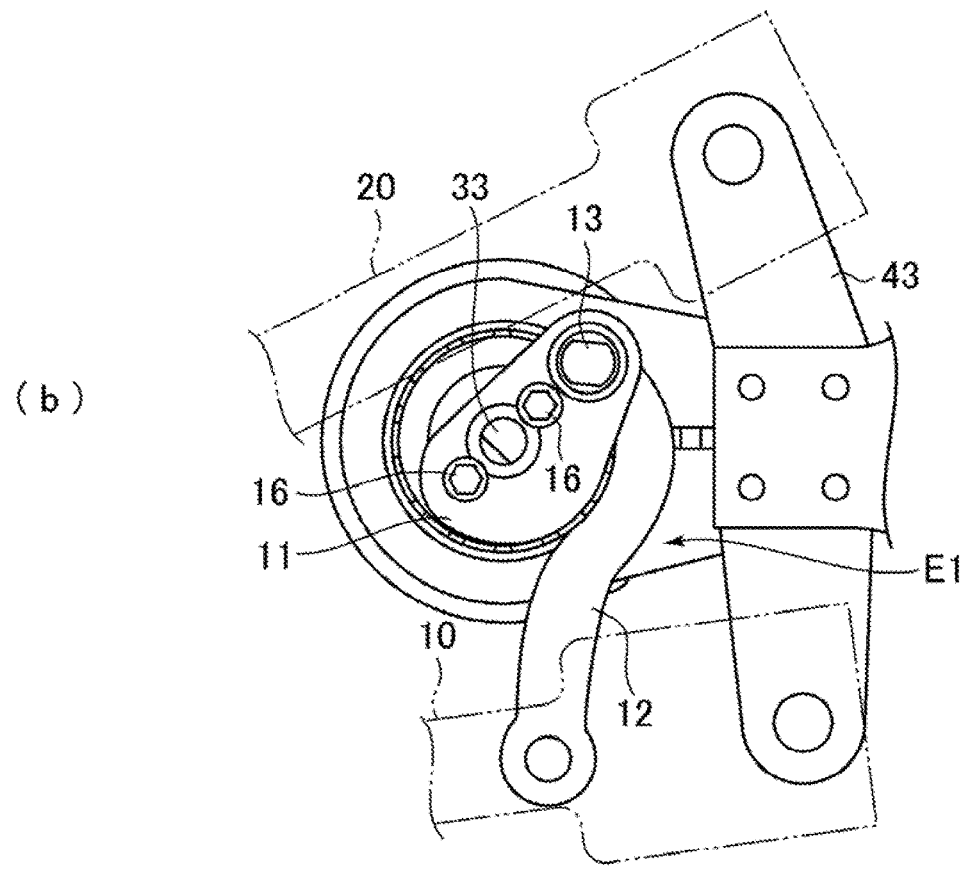
(b)

FIG.19
(a)
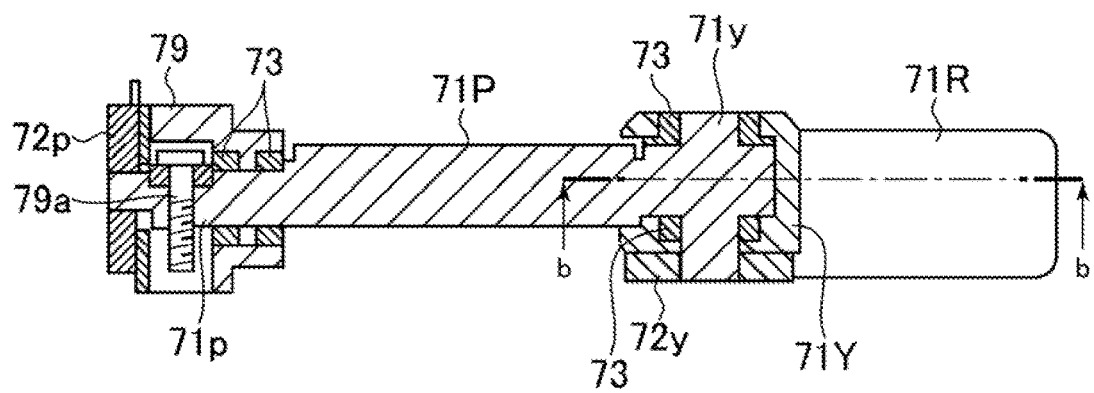
(b)
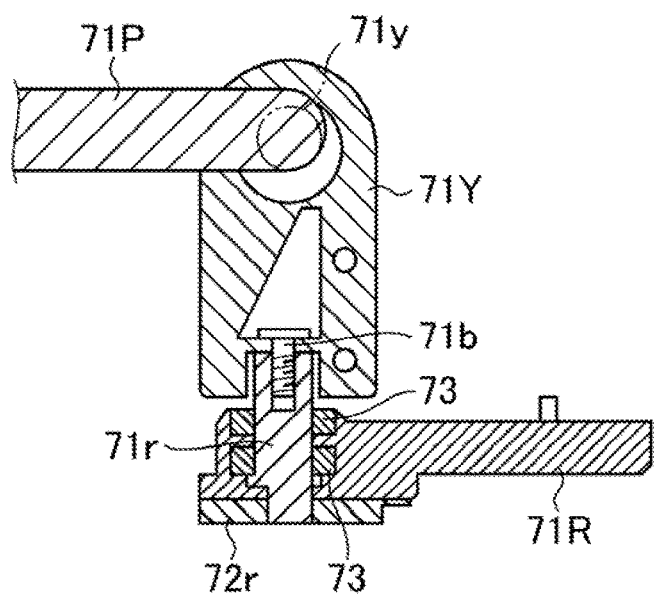

INTERFACE APPARATUS

CROSS REFERENCE TO RELATED APPLICATIONS

This application is a National Stage of International Application No. PCT/JP2013/071069 filed on Aug. 2, 2013. The contents of the above document is incorporated herein by reference in its entirety.

TECHNICAL FIELD

The present invention relates to an interface apparatus for presenting a force sense at a remote place or in a virtual space to a user.

BACKGROUND ART

Conventionally, development of an interface apparatus (Haptics apparatus) for presenting a force sense at a remote place or in a virtual space to a user, for example, for presenting counterforce received from an object in a virtual space to the user is advancing. As such an apparatus as just described, a pen type interface apparatus used in a state in which it is provided on a table, a floor or the like is proposed in Japanese Patent Laid-Open No. 2008-209689. Also a glove-shaped interface apparatus into which the user fits a hand thereof is proposed conventionally.

SUMMARY

Technical Problems

An interface apparatus that is used in a state in which it is placed on a table or a floor has a problem in that the user cannot use the interface apparatus while the user moves both hands in a space, and the interface apparatus has a problem in that it is restricted much in regard to a use form. Further, a glove-shaped interface apparatus includes a plurality of motors for moving fingers and has a problem in that the number of parts is great and the mechanism is complicated.

It is an object of the present invention to provide an interface apparatus that can decrease the number of motors and has a comparatively simple structure.

It is another object of the present invention to provide an interface apparatus that can be used while the user moves both hands in a space.

Solution to Problems

According to a form of the present invention, an interface apparatus includes a first arm and a second arm mounted for opening and closing motion being attached to a thumb and a finger other than the thumb, respectively, and a motor configured to exert force in opening and closing directions on the first arm and the second arm. The motor includes a motor main body supported for rotation, and a rotary shaft that relatively rotates with respect to the motor main body. The rotary shaft is connected to one of the first arm and the second arm while an other one of the first and second arms and the motor main body are connected to each other so as to impart rotation of the motor main body to the other one of the arms. With this interface apparatus, the number of motors required to move the arms can be reduced.

According to another form of the present invention, an interface apparatus includes a moving mechanism including a first portion and a second portion capable of relatively moving with respect to the first portion and having a driving apparatus moving one of the first and second portions, the driving apparatus being provided at an other one of the first and second portions. The interface apparatus further includes a first holding target unit configured to support the first portion and be held with one of upper limbs by a user, and a second holding target unit disposed in a spaced relationship in a leftward and rightward direction from the first holding target unit and connected to the second portion, the second holding target unit being permitted to perform at least one of rotation and change of a relative position thereof with respect to the first holding target unit by relative movement of the second portion, the second holding target being configured to be held with an other one of the hands of the upper limbs by the user. With this interface apparatus, a user can use this while moving both hands in a space, and the degree of freedom in the use form can be increased.

BRIEF DESCRIPTION OF DRAWINGS

FIG. 4 is a top plan view depicting a state in which the two arms are closed.

FIG. 19 is a sectional view of the rotation permission mechanism.

DESCRIPTION OF EMBODIMENTS

In the following, an embodiment of the present invention is described with reference to the drawings.

First Embodiment

Figure 1:
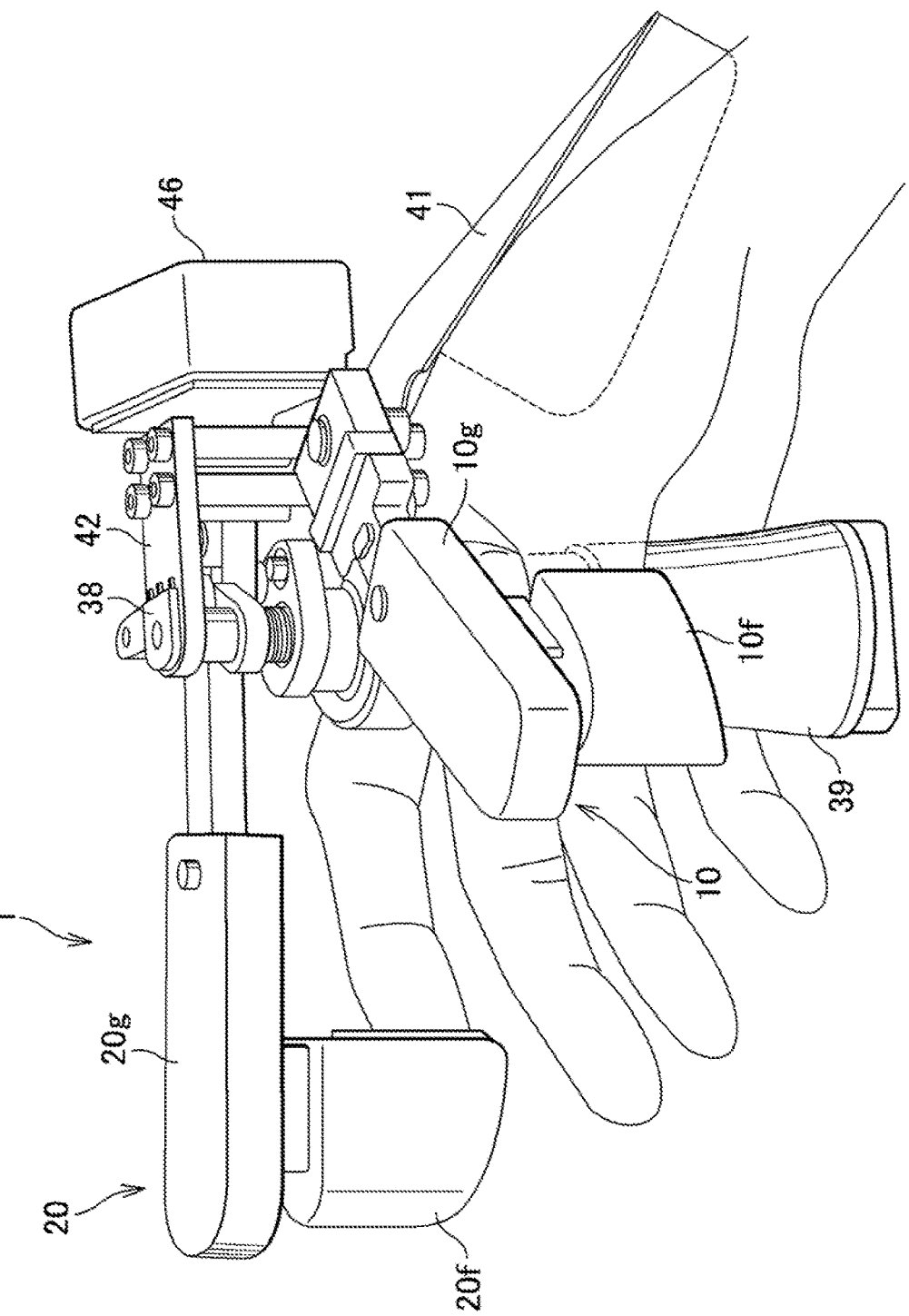
FIG. 1 is a perspective view of an interface apparatus according to a first embodiment of the present invention.
Figure 2:
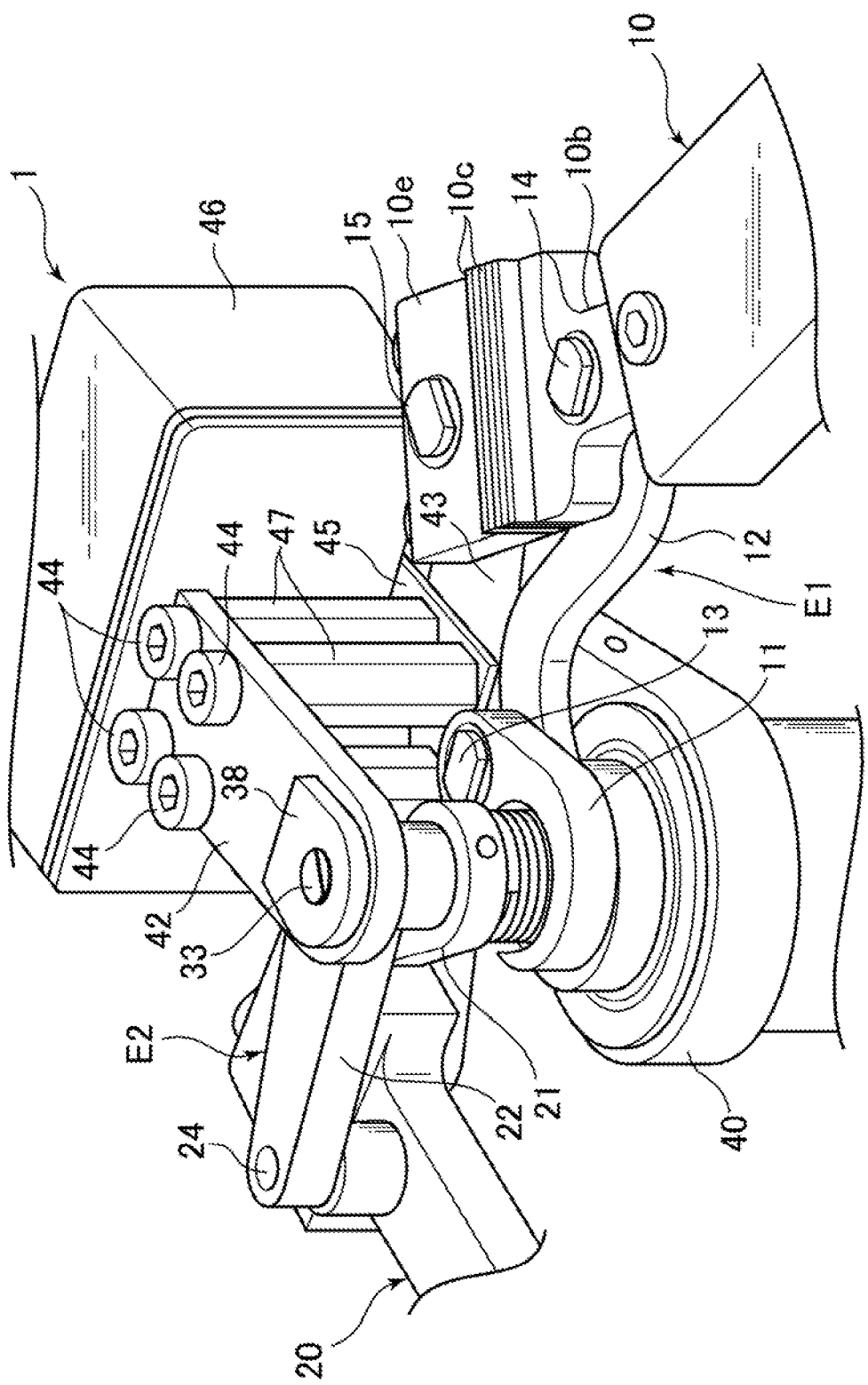
FIG. 2 is a perspective view of an upper portion of the interface apparatus.
Figure 3:
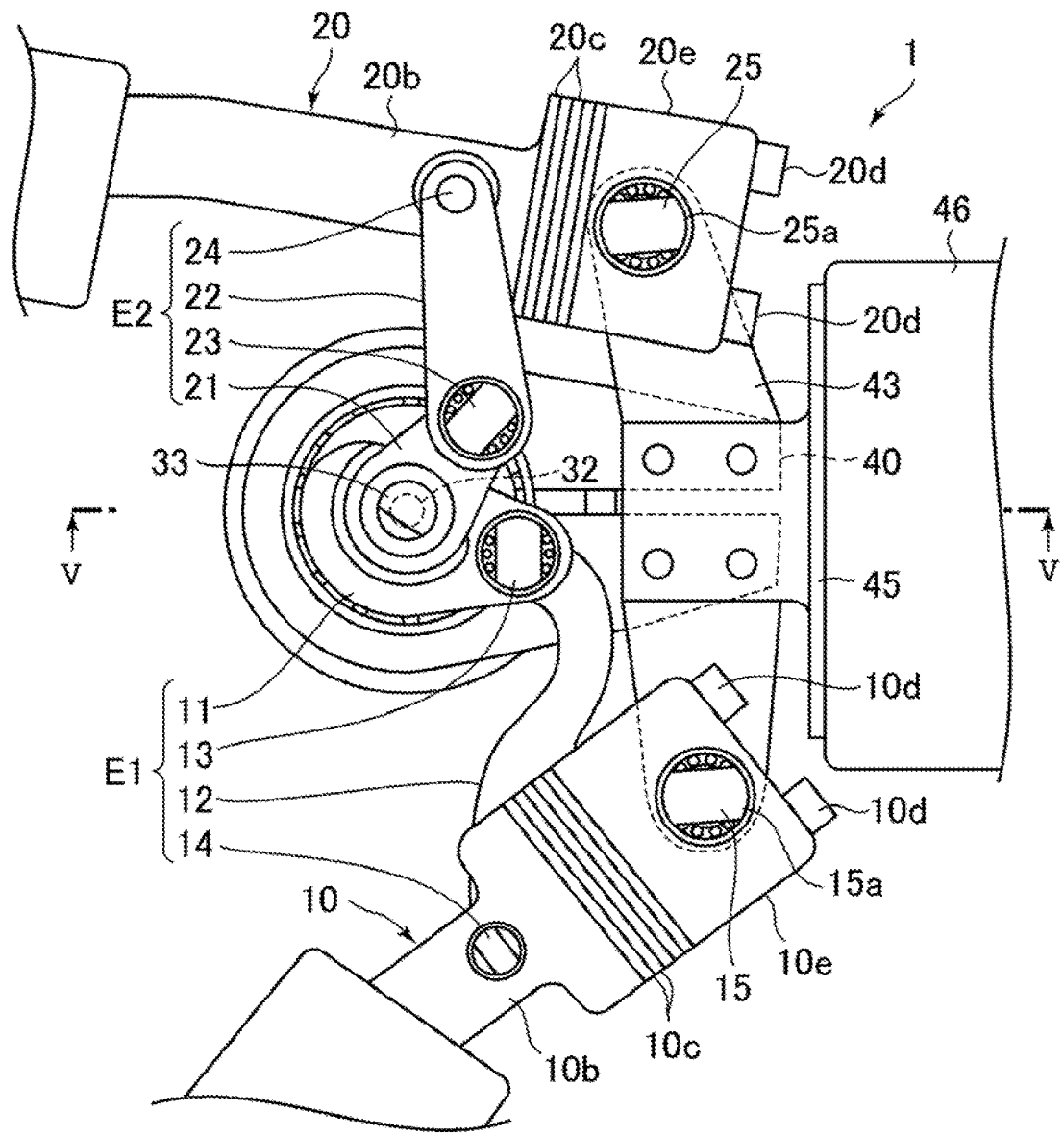
FIG. 3 is a top plan view depicting a state in which two arms are opened.
Figure 5:
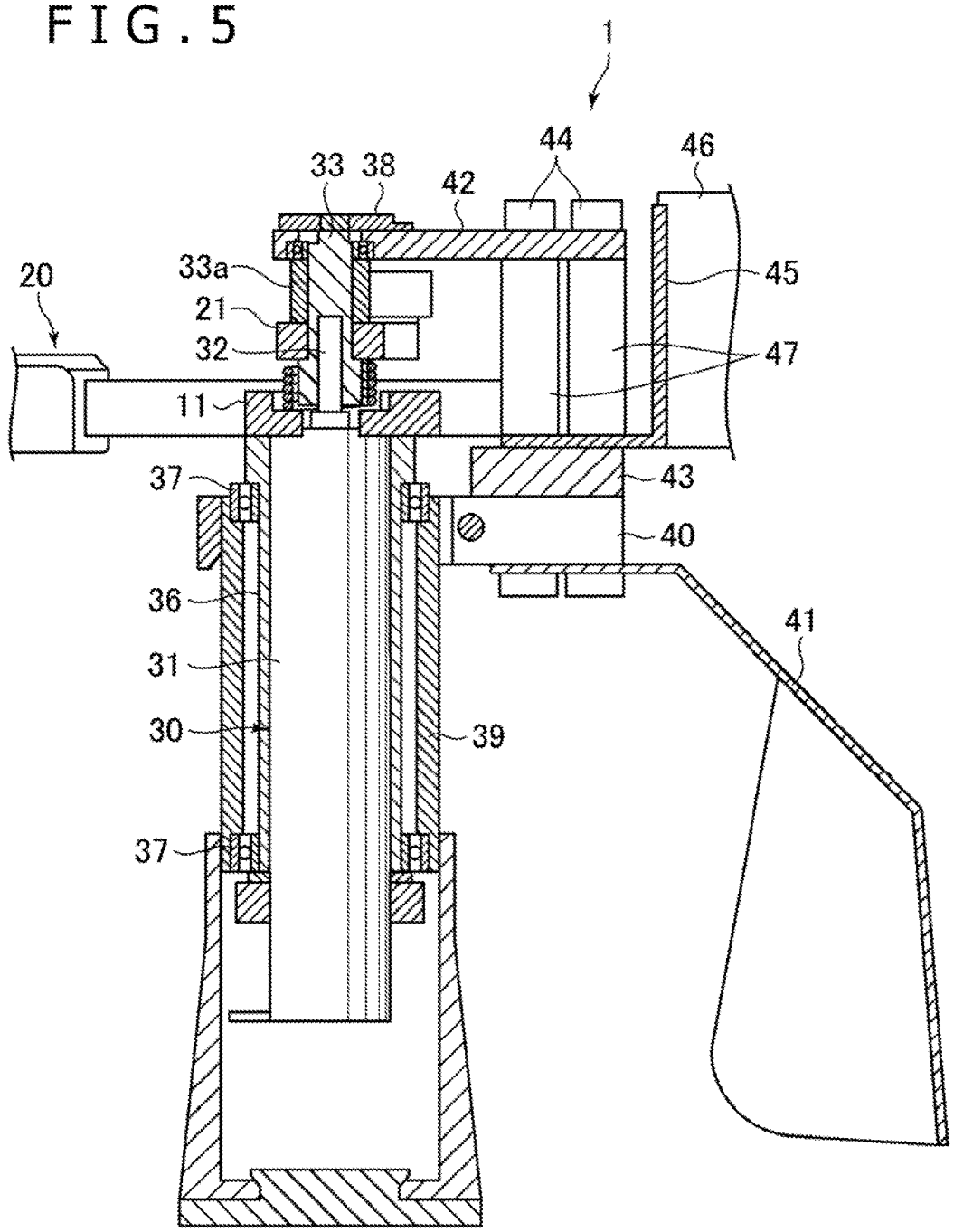
FIG. 5 is a sectional view taken along line V-V line depicted in FIG. 3.
Figure 6:
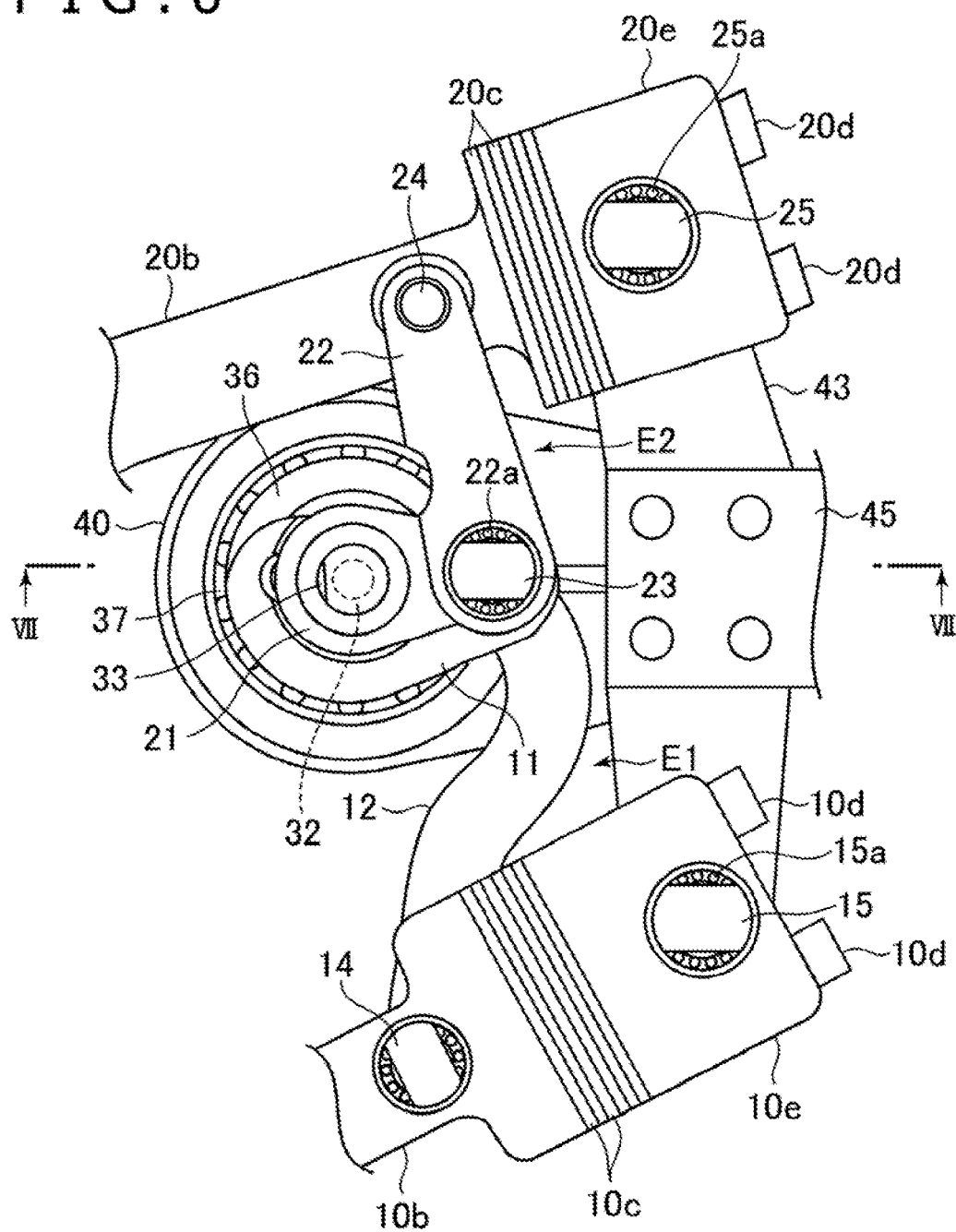
FIG. 6 is a top plan view depicting a state in which the two arms are placed at an intermediate position between an open position and a closed position.
Figure 7:
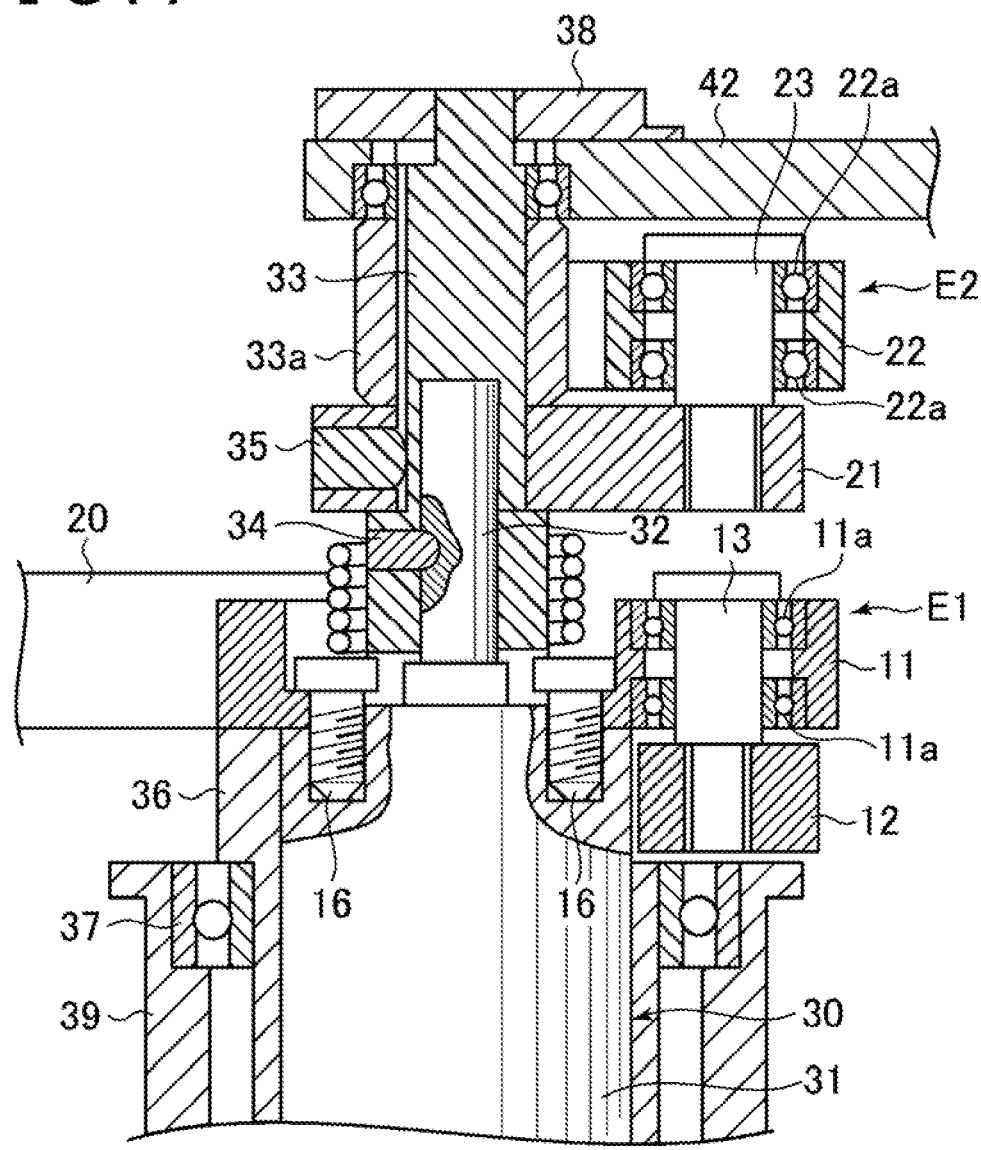
FIG. 7 is a sectional view taken along line VII-VII depicted in FIG. 6.

FIGS. 1 to 7 are views depicting an interface apparatus 1 according to a first embodiment of the present invention. FIGS. 1 and 2 are perspective views. FIG. 3 is a top plan view depicting a state in which two arms 10 and 20 are opened. In FIG. 3, an upper supporting member 42 and a spacer 33a hereinafter described are removed and link mechanisms E1 and E2 that connect a motor 30 and the arms 10 and 20 to each other are depicted. FIG. 4 is a top plan view depicting a state in which the arms 10 and 20 are closed. The upper supporting member 42 and the spacer 33a are removed in FIG. 4(a), and the link mechanism E2 is further removed in FIG. 4(b). FIG. 5 is a sectional view taken along line V-V depicted in FIG. 3. FIG. 6 is a top plan view depicting a state in which the arms 10 and 20 are placed at an intermediate position between an open position and a closed position, and the upper supporting member 42 is removed also in FIG. 6. FIG. 7 is a sectional view taken along line VII-VII depicted in FIG. 6.

As depicted in FIG. 1, the interface apparatus 1 includes a first arm 10 and a second arm 20 mounted for opening and closing motion. The first arm 10 is an arm for being mounted on the thumb of the user. The second arm 20 is an arm for being mounted on a finger other than the thumb. In the example depicted in FIG. 1, the second arm 20 is mounted on the index finger.

The interface apparatus 1 includes a sensor for detecting an opening and closing angle of the arms 10 and 20. The interface apparatus 1 is connected by wire or wireless connection to an information processing apparatus such as a game apparatus or a personal computer, and transmits an output of the sensor to the information processing apparatus. In an example of a use form of the interface apparatus 1, if the user opens or closes the arms 10 and 20, then the interface apparatus 1 transmits a sensor output corresponding to the movement of the arms 10 and 20 to the information processing apparatus. On a display apparatus connected to the information processing apparatus, a displayed operation object such as a hand grips or releases a different object (operation target object).

Further, the interface apparatus 1 includes the motor 30 (refer to FIG. 5) for exerting force in an opening and closing direction on the arms 10 and 20 and moving the arms 10 and 20 in the opening and closing direction. The motor 30 exerts counterforce against force for moving the arms 10 and 20 by the user and opens and closes the arms 10 and 20, for example, in accordance with an instruction received from the information processing apparatus. For example, where the operation target object displayed on the display apparatus is a hard object, the motor 30 exerts strong counterforce on the arms 10 and 20. Further, when the operation target object on the display apparatus moves, the motor 30 opens, for example, the arms 10 and 20.

As depicted in FIG. 3, a supporting shaft 15 is provided at a base portion of the first arm 10, and the first arm 10 is supported by the supporting shaft 15. In particular, the first arm 10 can move around the center provided by the supporting shaft 15 (refer to FIGS. 3 and 4(a)). The second arm 20 can move around the center provided by a supporting shaft 25 that is positioned in a spaced relationship in a radial direction from the supporting shaft 15 and is different from the supporting shaft 15 (refer to FIGS. 3 and 4(b)). The supporting shaft 25 is provided at a base portion of the second arm 20. When the user opens or closes the index finger and the thumb, fulcrums of the two fingers are spaced away from each other. Since the supporting shafts 15 and 20a are spaced away from each other, displacement between movement of the index finger and movement of the second arm 20 can be suppressed and a displacement between movement of the thumb and movement of the first arm 10 can be suppressed. It is to be noted that the supporting structure of the arms 10 and 20 is not necessarily limited to this. The arms 10 and 20 may be supported by a common supporting shaft.

In an example depicted in FIG. 3, the supporting shaft 15 is attached to the first arm 10 so as to integrally rotate with the first arm 10 and is supported by one end portion of an arm supporting member 43 through a bearing 15a. The supporting shaft 25 is attached to the second arm 20 so as to integrally rotate with the second arm 20 and is supported by the other one end portion of the arm supporting member 43 through a bearing 25a. It is to be noted that an attachment structure of the supporting shafts 15 and 25 may be suitably changed.

As depicted in FIG. 5, the motor 30 includes a motor main body 31 supported for rotation and a rotary shaft 32 capable of relatively rotating with respect to the motor main body 31. In the example described here, the motor main body 31 is accommodated in a motor case 39 and is supported for rotation on the inner side of the motor case 39. The rotary shaft 32 is connected to one of the two arms 10 and 20. The motor main body 31 is connected to one of the arms so that rotation of the motor is transmitted to the one of the arms. In particular, by rotating the motor main body 31, the one of the arms moves around the center provided by the supporting shaft.

In the example described here, the rotary shaft 32 is connected to the second arm 20 through the link mechanism E2 (refer to FIG. 3). The motor main body 31 is connected to the first arm 10 through the link mechanism E1 (refer to FIGS. 3 and 5). Since the motor main body 31 is supported for rotation and the motor main body 31 and the first arm 10 are connected to each other in this manner, the two arms 10 and 20 can be opened and closed by a single motor. For example, even where the position of the second arm 20 is not changed (namely, where the rotary shaft 32 does not rotate), the first arm 10 can be moved by rotation of the motor main body 31. In the example described here, a first link arm 11 that configures the link mechanism E1 is fixed to the motor main body 31 by a screw 16 (refer to FIG. 7). A connection structure between the motor main body 31 and the first arm 10 is hereinafter described in detail.

The motor 30 is disposed in a posture such that the rotary shaft 32 is orthogonal to a plane in which the first arm 10 and the second arm 20 open or close. In other words, the first arm 10 and the second arm 20 open and close in a plane orthogonal to an axial line of the rotary shaft 32 ("axial line" in the description here is a linear line that passes the center of rotation of the rotary shaft). Therefore, connection shafts 13, 14, 23, and 24 (refer to FIG. 3) individually having an axial line parallel to the axial line of the rotary shaft 32 can be used for the link mechanisms E1 and E2. As a result, the coupling structure between the motor 30 and the arms 10 and 20 can be simplified. The motor 30 is disposed such that the rotary shaft 32 thereof is positioned on the upper side of the motor main body 31.

The motor 30 is positioned between the two arms 10 and 20 where the interface apparatus 1 is viewed in plan. More particularly, the motor 30 is positioned rather near to end portions of the arms 10 and 20 than the supporting shafts 15 and 20a of the arms 10 and 20. Consequently, the motor 30 and the motor case 39 can be positioned on the inner side of the palm of the user when the interface apparatus 1 is mounted on the hand of the user. Therefore, the motor case 39 can function as a grip to be gripped by the user, and the mounting stability of the interface apparatus 1 can be enhanced.

The layout of the motor 30 is not limited to that described above. For example, the motor 30 may be disposed in parallel to the plane in which the two arms 10 and 20 open and close. Further, the motor 30 may be disposed on the outer side of the two arms 10 and 20.

A rotation sensor for detecting a relative rotational angle of the motor main body 31 and the rotary shaft 32 is provided on the motor 30. The rotation sensor is provided so as to integrally rotate with one of the motor main body 31 and the rotary shaft 32. The rotation sensor is configured, for example, from a rotary encoder. Alternatively, the rotation sensor may be a potentiometer. Consequently, a relative opening and closing angle of the first arm 10 and the second arm 20 can be detected by a reduced number of sensors. In the example described here, the rotation sensor is built in the motor main body 31. It is to be noted that, as hereinafter described, not only the rotation sensor built in the motor main body 31 but also a rotation sensor 38 (refer to FIG. 2) for detecting an absolute rotational position (namely, a rotational position with reference to the motor case 39) of the second arm 20 are provided in the interface apparatus 1.

Further, the motor 30 is a geared motor configured by building a reduction gear in the motor main body 31. Consequently, the number of parts of the interface apparatus 1 can be decreased. The motor 30 is not limited to this. For example, a reduction gear may be provided separately from the motor 30.

The link mechanism E1 is configured such that the first arm 10 moves around the center provided by the supporting shaft 15 when the motor main body 31 rotates with respect to the motor case 39. The link mechanism E1 in the example described here includes a first link arm 11, a connection shaft 13, a second link arm 12, and a connection shaft 14 (refer to FIG. 3).

The first link arm 11 is disposed so as to extend in a radial direction of the motor main body 31 from the motor main body 31, and is attached to the motor main body 31 so as to integrally rotate with the motor main body 31. As depicted in FIG. 7, the first link arm 11 is attached, for example, to an upper face of the motor main body 31. An opening is formed in the first link arm 11, and the rotary shaft 32 of the motor 30 is disposed on the inner side of the opening. The first link arm 11 is attached to the upper face of the motor main body 31 by a plurality of (in this example, two) screws 16.

The attachment structure of the motor main body 31 and the first link arm 11 of the motor 30 is not limited to the structure described above. For example, the first link arm 11 may be attached to an outer peripheral face of the motor main body 31. As depicted in FIG. 5, the motor main body 31 in the example described here is fitted in a cylindrical inner case that integrally rotates with the motor main body 31. The first link arm 11 may be attached to an upper face or an outer peripheral face of the inner case 36. In the example described here, the inner case 36 and the motor main body 31 are supported for rotation on the inner side of the motor case 39. In particular, a plurality of (in this example, two) bearings 37 positioned in a spaced relationship from each other in the upward and downward direction are fitted with the outer side of the inner case 36, and the motor case 39 supports the inner case 36 and the motor main body 31 through the bearings 37.

The first link arm 11 is connected to the second link arm 12 through the connection shaft 13. As depicted in FIG. 7, the first link arm 11 is connected to the connection shaft 13, for example, through bearings 11a, and the second link arm 12 is attached at an end portion thereof to the connection shaft 13 so as to integrally rotate with the connection shaft 13. As depicted in FIG. 6, the second link arm 12 is connected at the other end portion thereof to the first arm 10 through the connection shaft 14. The connection shaft 14 is attached to the other end portion of the second link arm 12 so as not to be capable of relatively rotating, for example, with respect to the second link arm 12, and the first arm 10 is connected to the connection shaft 14 through a bearing. Therefore, for example, if the motor main body 31 rotates in the counterclockwise direction in the open state depicted in FIG. 3, then the first arm 10 approaches the second arm 20. The connection shaft 14 is disposed between the supporting shaft 15 of the first arm 10 and an end portion of the first arm 10. Therefore, the length of the first arm 10 is sufficient with the distance from the supporting shaft 15 to the first arm 10 (namely, a length corresponding to a finger of the user). It is to be noted that the link mechanism E1 may be configured not from a plurality of link arms but from a plurality of gears.

The link mechanism E2 connects the rotary shaft 32 and the second arm 20 to each other so that rotation of the rotary shaft 32 is imparted to the second arm 20. In particular, the link mechanism E2 is configured such that the second arm 20 moves around the center provided by the supporting shaft 25 when the rotary shaft 32 rotates. The link mechanism E2 in the example described here includes a first link arm 21, a connection shaft 23, a second link arm 22, and a connection shaft 24 similarly to the link mechanism E1 (refer to FIG. 3).

The first link arm 21 is disposed so as to extend in a radial direction of the rotary shaft 32 from the rotary shaft 32 and can integrally rotate with the rotary shaft 32. An extension shaft 33 that extends upwardly further from the rotary shaft 32 is attached to the rotary shaft 32. The extension shaft 33 can integrally rotate with the rotary shaft 32. As depicted in FIG. 7, the extension shaft 33 and the rotary shaft 32 are fixed to each other, for example, by a pin 34 inserted in a hole formed in an outer peripheral face of the extension shaft 33. The first link arm 21 is attached to the extension shaft 33. The first link arm 21 in the example depicted in FIG. 7 has a hole on an outer peripheral face thereof, and a pin 35 to be inserted in the hole is caught by a spline formed on the outer peripheral face of the extension shaft 33. Consequently, the first link arm 21 and the rotary shaft 32 rotate integrally with each other. It is to be noted that the fixing method for the first link arm 21 and the rotary shaft 32 is not limited to that described above and may be changed in various manners. Further, the extension shaft 33 may not necessarily be attached to the rotary shaft 32.

The first link arm 21 is connected to the second link arm 22 through the connection shaft 23. The connection shaft 23 in the example depicted in FIG. 7 is attached to the first link arm 21 so as to integrally rotate with the first link arm 21. The second link arm 22 is connected to the connection shaft 23 through bearings 22a. As depicted in FIG. 6, the second link arm 22 is connected at the other end portion thereof to the second arm 20 through the connection shaft 24. The connection shaft 24 is attached to one end portion of the first link arm 21 so as not to be capable of relatively rotating, for example, with respect to the first link arm 21, and the second arm 20 is connected to the connection shaft 24 through a bearing. Therefore, for example, if the rotary shaft 32 rotates in a clockwise direction in the open state depicted in FIG. 3, then the second arm 20 approaches the first arm 10. The connection shaft 24 is disposed between the supporting shaft 25 of the second arm 20 and an end portion of the second arm 20. Therefore, the length of the second arm 20 is sufficient with the distance from the supporting shaft 25 to the second arm 20 (namely, a length corresponding to a finger of the user). It is to be noted that the link mechanism E2 may be configured not from a plurality of link arms but from a plurality gears.

The first arm 10 is configured such that the distance between the supporting shaft 15 and the connection shaft 14 can be adjusted. Similarly, the second arm 20 is configured such that the distance between the supporting shaft 25 and the connection shaft 24 can be adjusted. Consequently, force acting on the arms 10 and 20 through the link mechanisms E1 and E2 from the motor 30 can be adjusted and the movable range of the arms 10 and 20 can be adjusted. As depicted in FIG. 6, the first arm 10 in the example described here includes a base portion 10e to which the supporting shaft 15 is attached and an arm main body 10b to which the connection shaft 14 is attached. Further, a plurality of plate-shaped length adjustment members 10c juxtaposed in an extending direction of the first arm 10 are disposed between the base portion 10e and the arm main body 10b. The base portion 10e, the length adjustment members 10c, and the arm main body 10b are connected to each other by a screw 10d. Similarly, the second arm 20 includes a base portion 20e to which the supporting shaft 25 is attached and an arm main body 20b to which the connection shaft 24 is attached. Further, a plurality of plate-shaped length adjustment members 20c juxtaposed in an extending direction of the first arm 20 are disposed between the base portion 20e and the arm main body 20b. The base portion 20e, the length adjustment members 20c, and the arm main body 20b are connected to each other by a screw 20d.

The interface apparatus 1 includes a member that is disposed in a spaced relationship in a radial direction of the motor 30 from the motor case 39 and cooperates with the motor case 39 to sandwich a hand of the user therebetween. As depicted in FIGS. 1 and 5, the interface apparatus 1 in the example described here includes a hand cover 41. The hand cover 41 is disposed in a spaced relationship in a radial direction of the motor 30 from the motor case 39 and is connected to an upper portion of the motor case 39. With the structure, mounting stability of the interface apparatus 1 can be enhanced. Particularly, since the hand cover 41 is connected at an upper portion thereof to an upper portion of the motor case 39, the user can insert and fit the hand thereof from the lower side into a space between the motor case 39 and the hand cover 41. While the hand cover 41 in the example described here has a plate shape, the shape of the hand cover 41 may be suitably changed.

As depicted in FIGS. 3 and 5, a case holder 40 that extends in a radial direction of the motor 30 is attached to an upper portion of the motor case 39. The motor case 39 is fitted in the inner side of a hole formed in the case holder 40, and the case holder 40 holds the motor case 39. The hand cover 41 is attached at an upper end thereof to the case holder 40.

As depicted in FIGS. 3 and 5, an arm supporting member 43 is attached further to the case holder 40. The arm supporting member 43 is disposed so as to be orthogonal to the extending direction of the case holder 40 (radial direction of the rotary shaft 32). As described above, the supporting shaft 15 of the first arm 10 and the supporting shaft 25 of the second arm 20 are supported by the opposite end portions of the arm supporting member 43.

As depicted in FIGS. 2 and 5, the interface apparatus 1 in the example described here includes the upper supporting member 42 extending in a radial direction of the extension shaft 33. The extension shaft 33 is supported at the upper end thereof for rotation by the upper supporting member 42. The upper supporting member 42 and the case holder 40 are fixed to each other. With the structure just described, the load in a radial direction acts on the rotary shaft 32 and the extension shaft 33, and displacement of the rotational center can be suppressed. The tubular spacer 33a to be fitted with the extension shaft 33 is disposed between the upper supporting member 42 and the first link arm 21 that configures the link mechanism E2.

As depicted in FIGS. 2 and 5, the case holder 40 and the upper supporting member 42 are disposed in a spaced relationship from each other in an upward and downward direction (axial direction of the rotary shaft 32). They are fixed to each other by a plurality of (in the example described here, four) bolts 44. A plurality of tubular spacers 47 are disposed between the case holder 40 and the upper supporting member 42. The bolts 44 extend in the inner side of the spacers 47. Also the arm supporting member 43 is disposed between and fixed to the case holder 40 and the upper supporting member 42 by the bolts 44. A frame of the interface apparatus 1 is configured from the case holder 40, the upper supporting member 42, the spacers 47, and the arm supporting member 43. It is to be noted that a plate-shaped bracket 45 is disposed further between the case holder 40 and the upper supporting member 42. Also the bracket 45 is fixed to the case holder 40 and the upper supporting member 42 by the bolts 44. A housing 46 is attached to the bracket 45. For example, a driving circuit for applying driving power to the motor 30 is disposed in the housing 46. It is to be noted that the supporting structure for the housing 46 and the structure of the frame configured from the case holder 40 and so forth may be suitably changed.

As depicted in FIG. 2, a rotation sensor 38 for detecting a rotational angle of the rotary shaft 32 (rotational angle with reference to the motor case 39) is attached to an upper face of the upper supporting member 42. The rotational angle of the second arm 20 around the supporting shaft 25 can be detected by the rotation sensor 38. The rotation sensor 38 is configured, for example, from a potentiometer. Alternatively, the rotation sensor 38 may be a rotary encoder. The interface apparatus 1 includes the rotation sensor 38 for detecting a rotational position of the second arm 20 and a sensor for detecting a relative rotational angle of the two arms 10 and 20 in which the motor 30 is built. The interface apparatus 1 may not necessarily include the rotation sensor 38.

Figure 8:
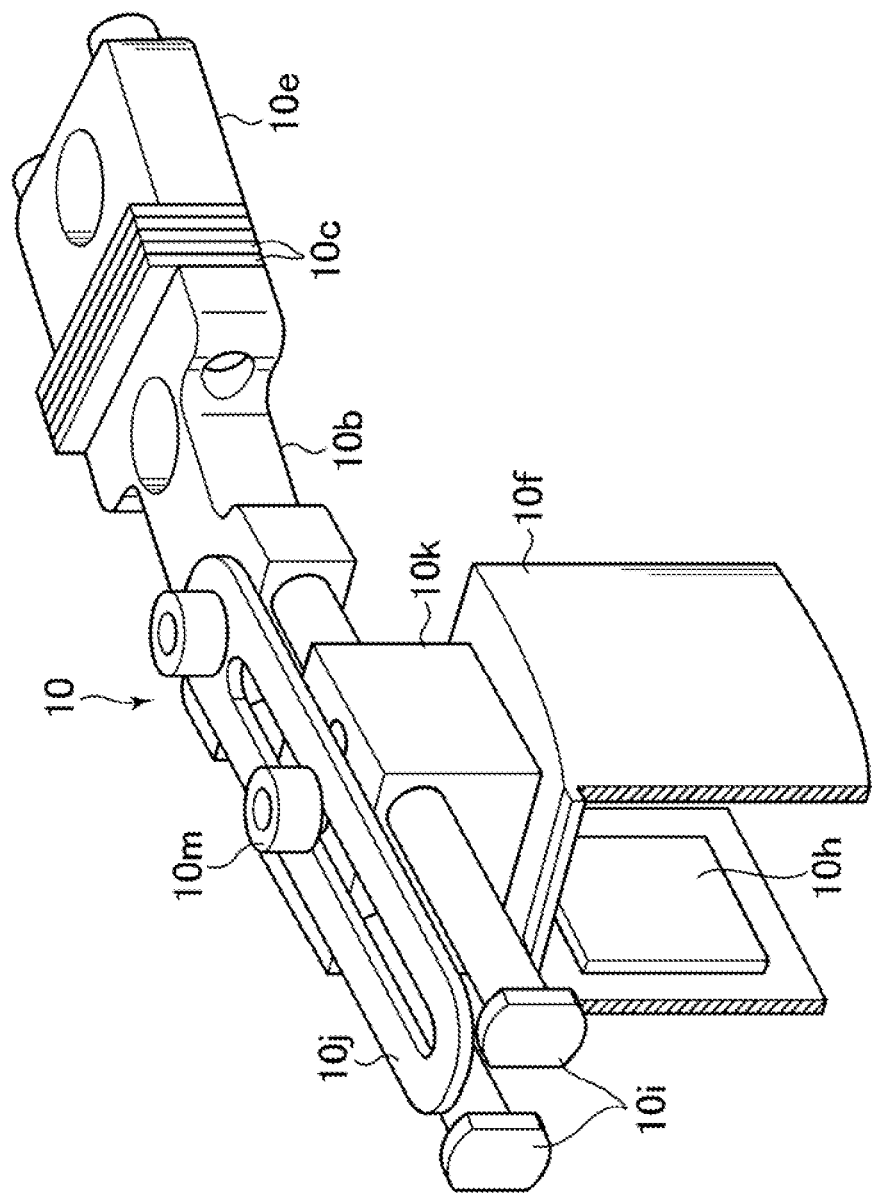
FIG. 8 is a perspective view depicting a first arm. This figure depicts a state in which a cover provided on the first arm is removed.

As depicted in FIG. 1, the first arm 10 and the second arm 20 individually have a portion for being caught by a finger at an end portion thereof. The arms 10 and 20 in the example described here have fingertip cases 10f and 20f at an end portion thereof, respectively. FIG. 8 is a perspective view depicting the first arm 10. FIG. 8 depicts a state in which a cover 10g (refer to FIG. 1) provided on the first arm 10 is removed.

As depicted in FIG. 8, a power sensor 10h is disposed on the inner side of the fingertip case 10f (in FIG. 8, an end portion of the fingertip case 10f is cut off in order to indicate the power sensor 10h). A portion with which a finger of the user is to contact is disposed on an inner face of the fingertip case 10f. A power sensor is provided also on the fingertip case 20f of the second arm 20. Consequently, force acting on the arms 10 and 20 when the user closes the arms 10 and 20 can be detected.

For the arms 10 and 20, mechanisms for adjusting the position of the fingertip cases 10f and 23 in the lengthwise direction of them are provided. By the mechanisms, the position of the fingertip cases 10f and 20f can be adjusted in response to the length of the fingers of the user. The first arm 10 in the example depicted in FIG. 8 has two bar-shaped guides 10i disposed in parallel to each other. Each of the guides 10i includes a slide member 10k that is movable therealong. The fingertip case 10f is attached to the slide member 10k. Consequently, the position of the fingertip case 10f can be adjusted. The first arm 10 has a supporting bar 10j disposed in parallel to the guides 10i. The slide member 10k can be fixed to the supporting bar 10j by a screw 10m. It is to be noted that the second arm 20 has a mechanism provided on the inner side of the cover 20g for adjusting the position of the fingertip case 23, which is configured from a guide, a slide member or the like, similarly to the first arm 10.

As described above, the interface apparatus 1 has the first arm 10 and the second arm 20 mounted for opening and closing movement for being attached to the thumb and a finger other than the thumb. Further, the interface apparatus 1 has the motor 30 for exerting force in the opening and closing directions upon the first arm 10 and the second arm 20. The motor 30 has the motor main body 31 supported for rotation, and the rotary shaft 32 which relatively rotates with respect to the motor main body 31. The rotary shaft 32 is connected to one of the first arm 10 and the second arm 20. The motor main body 31 is connected to the other arm such that rotation of the motor main body 31 is imparted to the other arm. With the interface apparatus 1, the number of motors for driving the arms 10 and 20 to open and close can be reduced.

Second Embodiment

Figure 9:
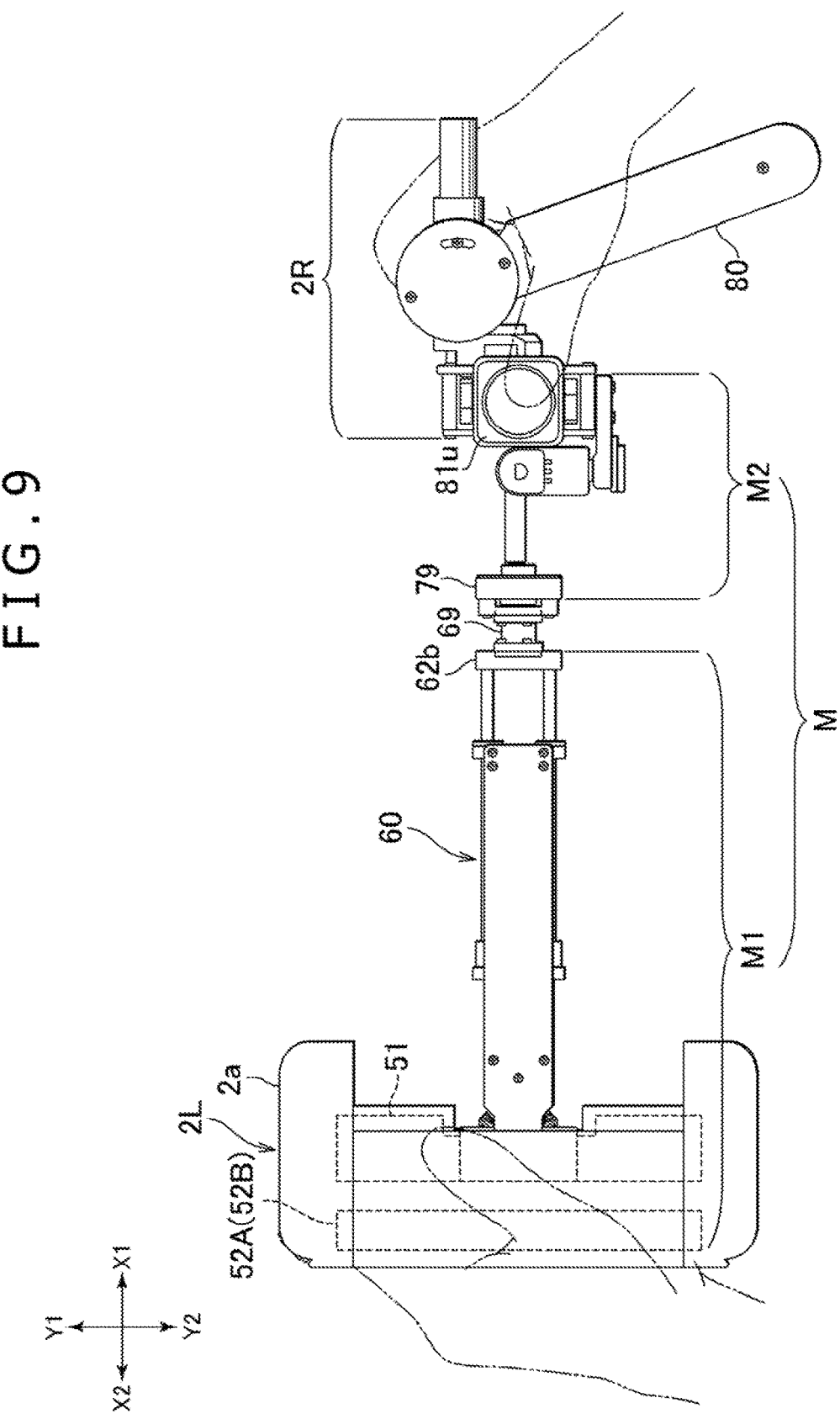
FIG. 9 is a top plan view of an interface apparatus according to a second embodiment of the present invention.

A second embodiment of the present invention is described. FIGS. 9 to 23 are views depicting an interface apparatus 2 according to the second embodiment. FIG. 9 is a top plan view of the interface apparatus 2. The interface apparatus 2 includes a moving mechanism M, a left holding target unit 2L provided on one side (left side in the example of FIG. 9) of the moving mechanism M, and a right holding target unit 2R provided on the other side (right side in the example of FIG. 9) of the moving mechanism M. The moving mechanism M includes a position changing mechanism M1 that permits change of the relative position of the right holding target unit 2R with respect to the left holding target unit 2L, and a rotation permission mechanism M2 that permits rotation of the right holding target unit 2R.

Figure 10:
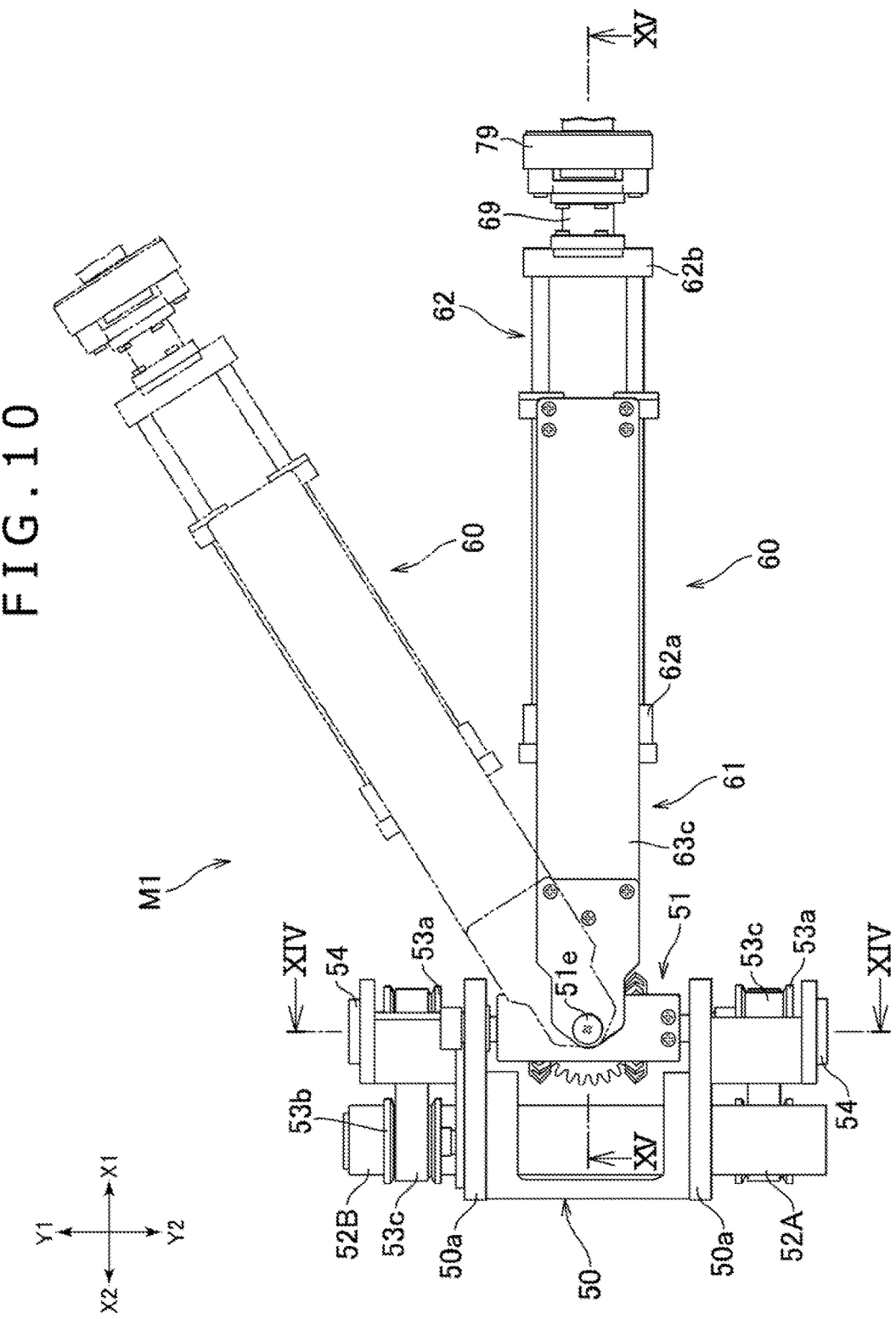
FIG. 10 is a top plan view of a position changing mechanism.
Figure 11:
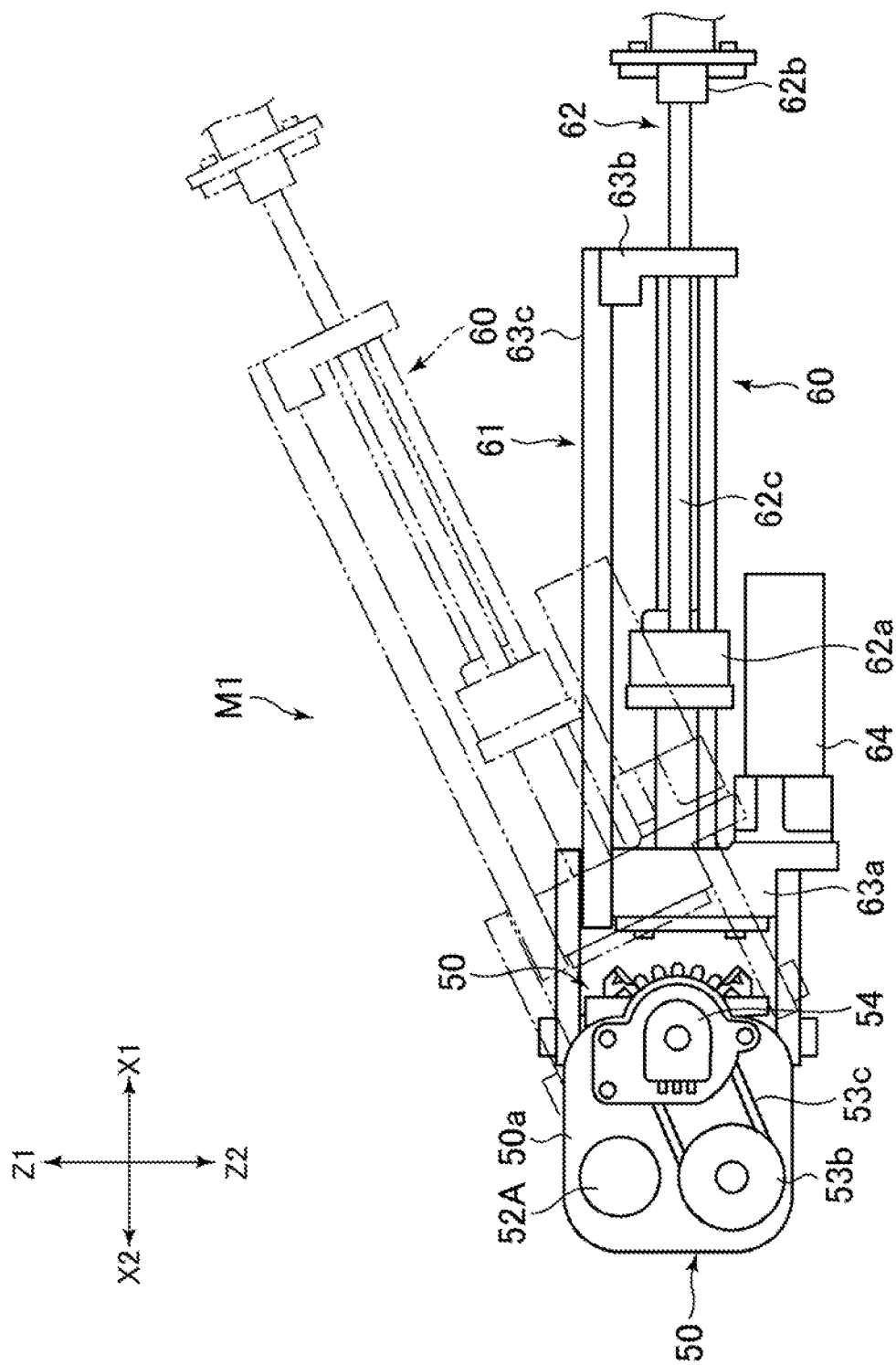
FIG. 11 is a rear elevational view of the position changing mechanism.
Figure 12:
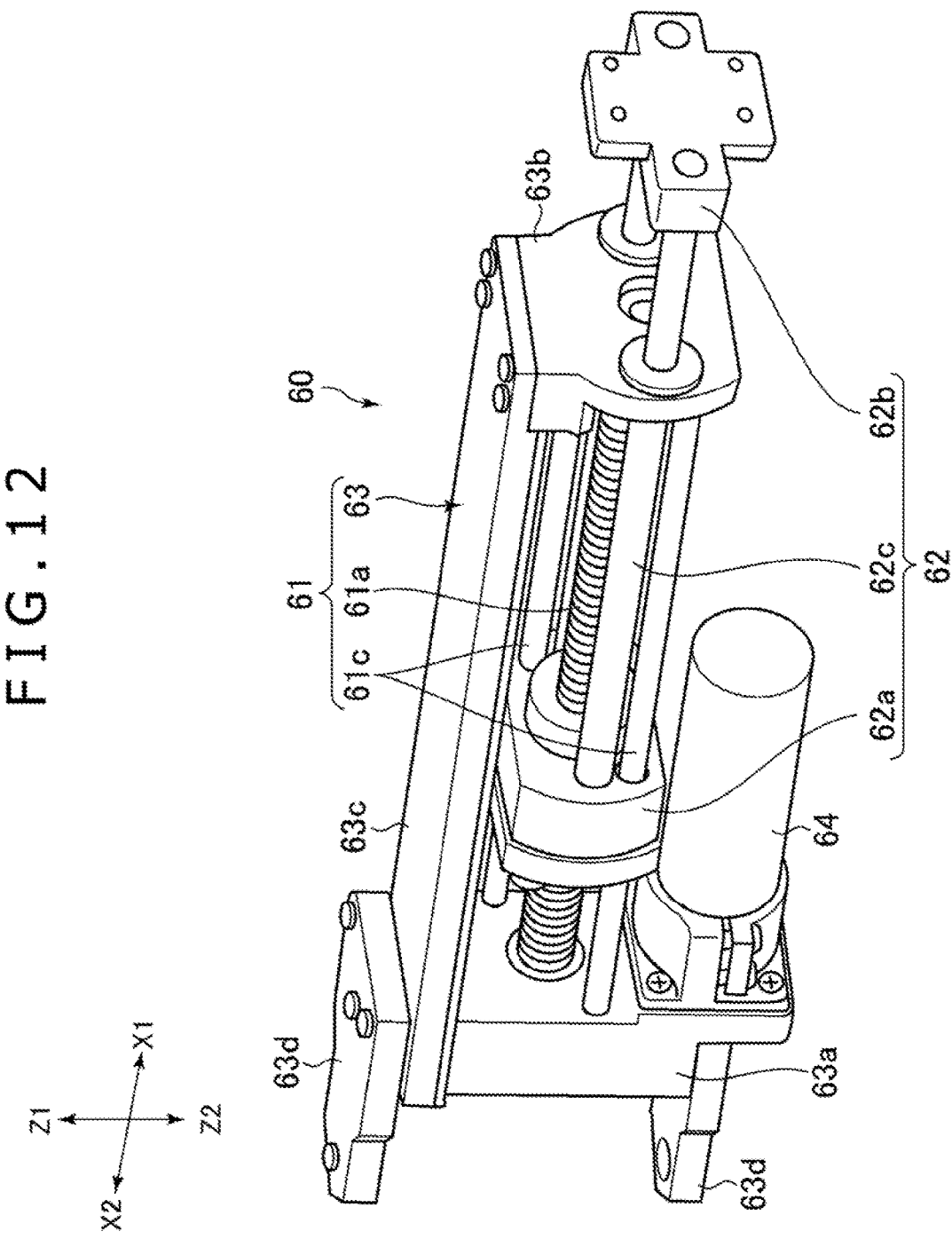
FIG. 12 is a perspective view of an arm configuring the position changing mechanism.
Figure 13:
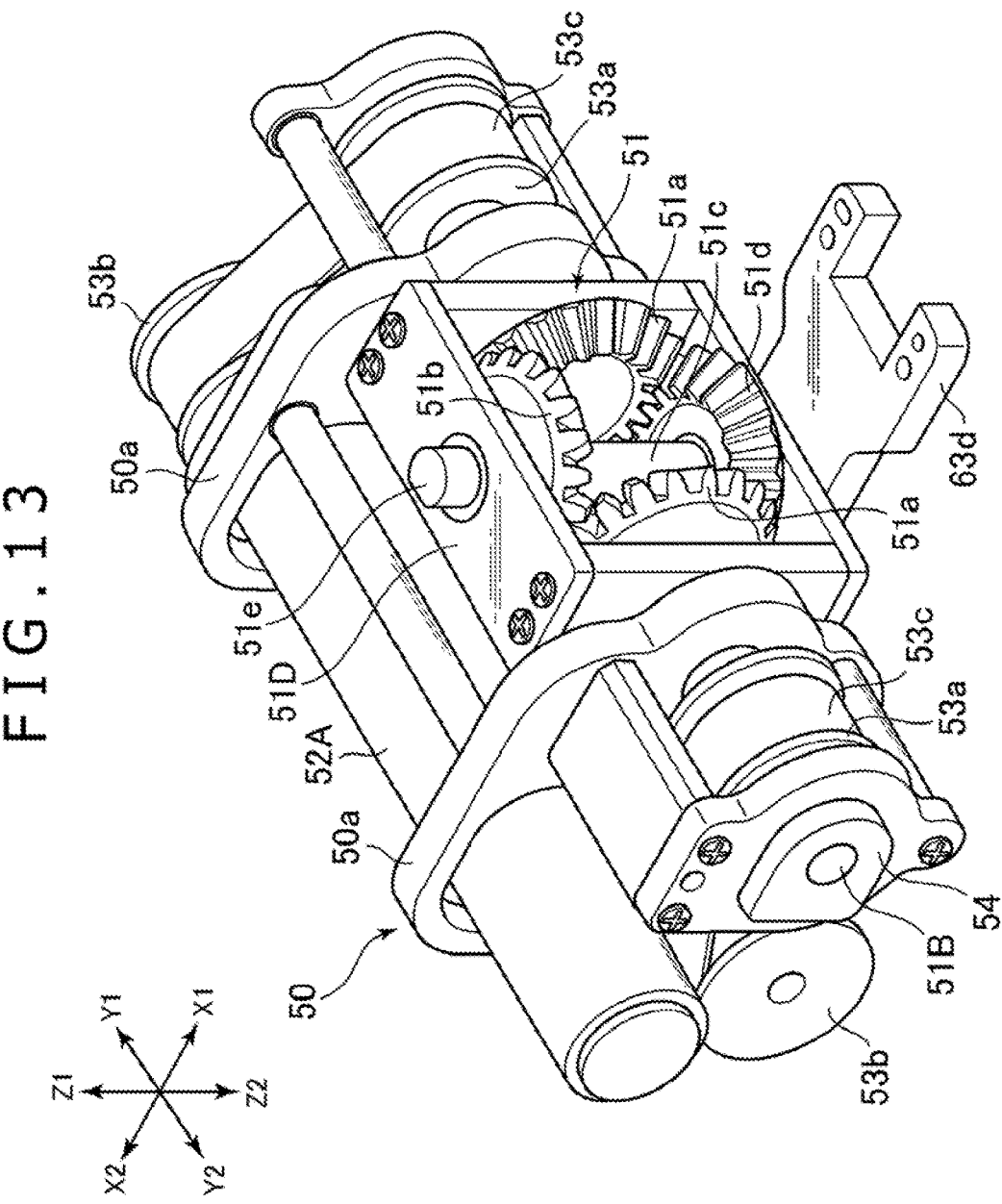
FIG. 13 is a perspective view depicting a differential apparatus that configures the position changing mechanism.
Figure 14:
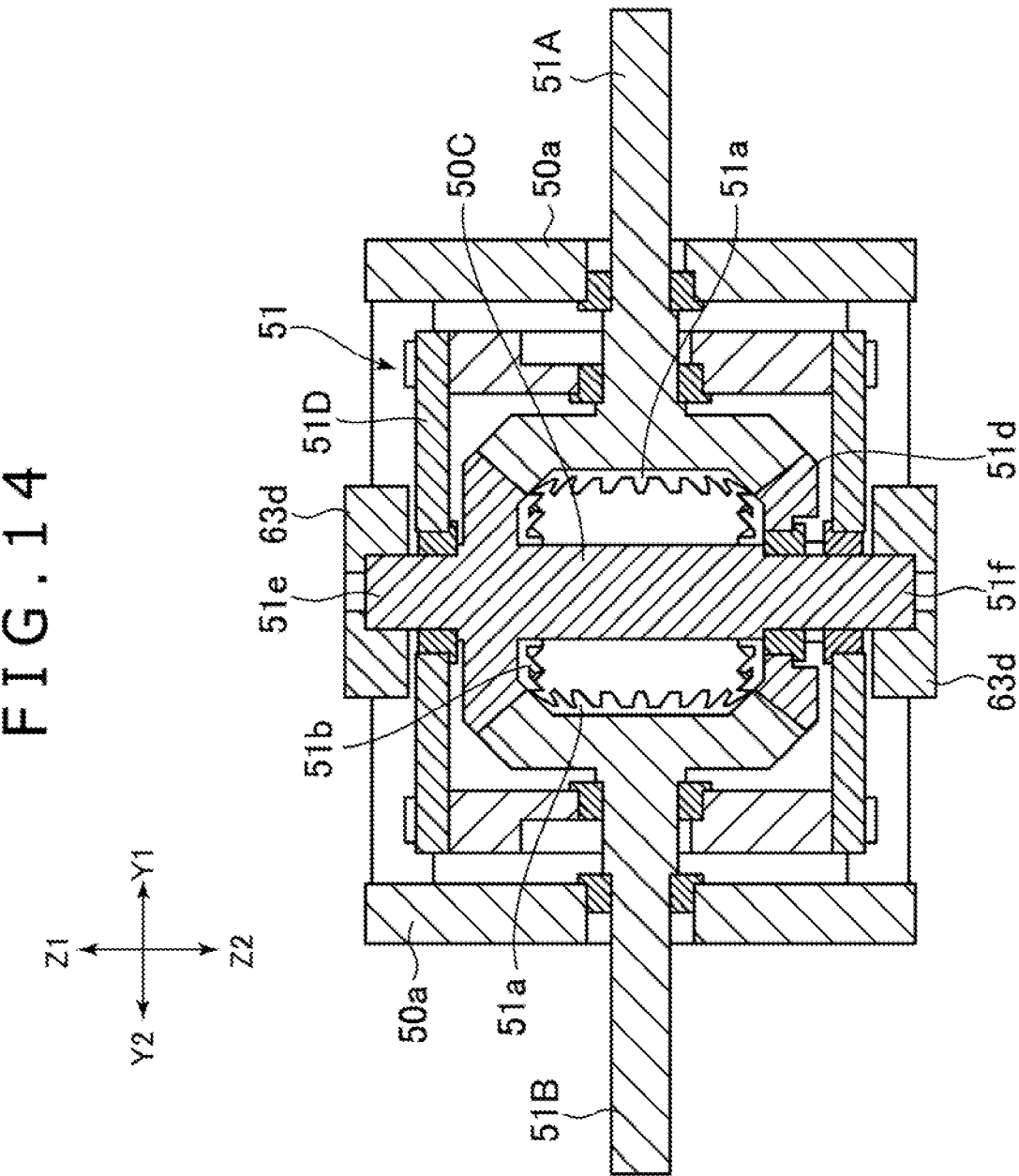
FIG. 14 is a sectional view taken along line XIV-XIV depicted in FIG. 10.
Figure 15:
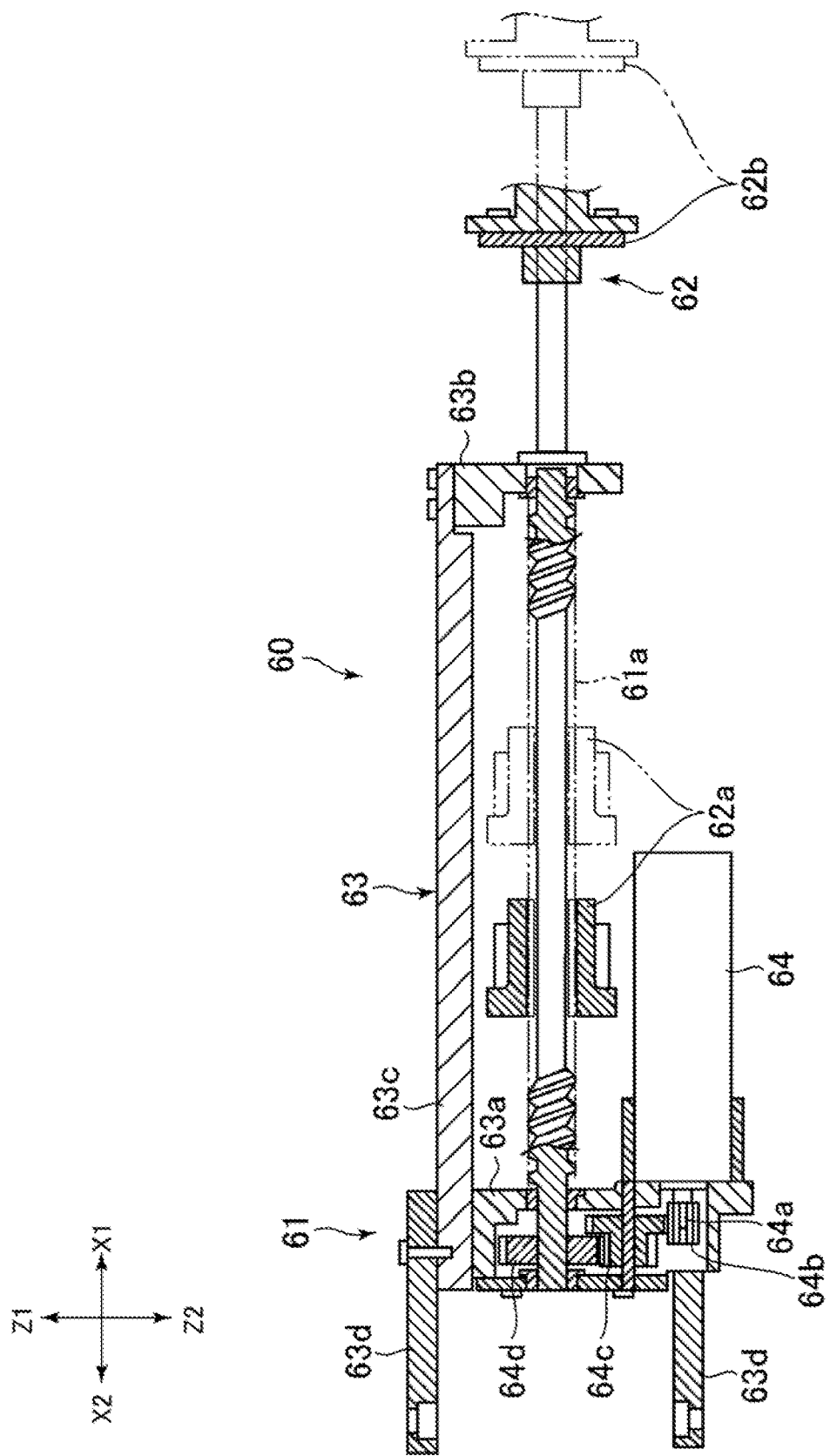
FIG. 15 is a sectional view taken along line XV-XV depicted in FIG. 10.

FIGS. 10 to 15 are views depicting the position changing mechanism M1. FIG. 10 is a top plan view and FIG. 11 is a rear elevational view. FIG. 12 is a perspective view of an arm 60 that configures the position changing mechanism M1. FIG. 13 is a perspective view depicting a differential apparatus 51 that configures the position changing mechanism M1, and FIG. 14 is a sectional view taken along line XIV-XIV depicted in FIG. 10. FIG. 15 is a sectional view taken along line XV-XV depicted in FIG. 10.

Figure 16:
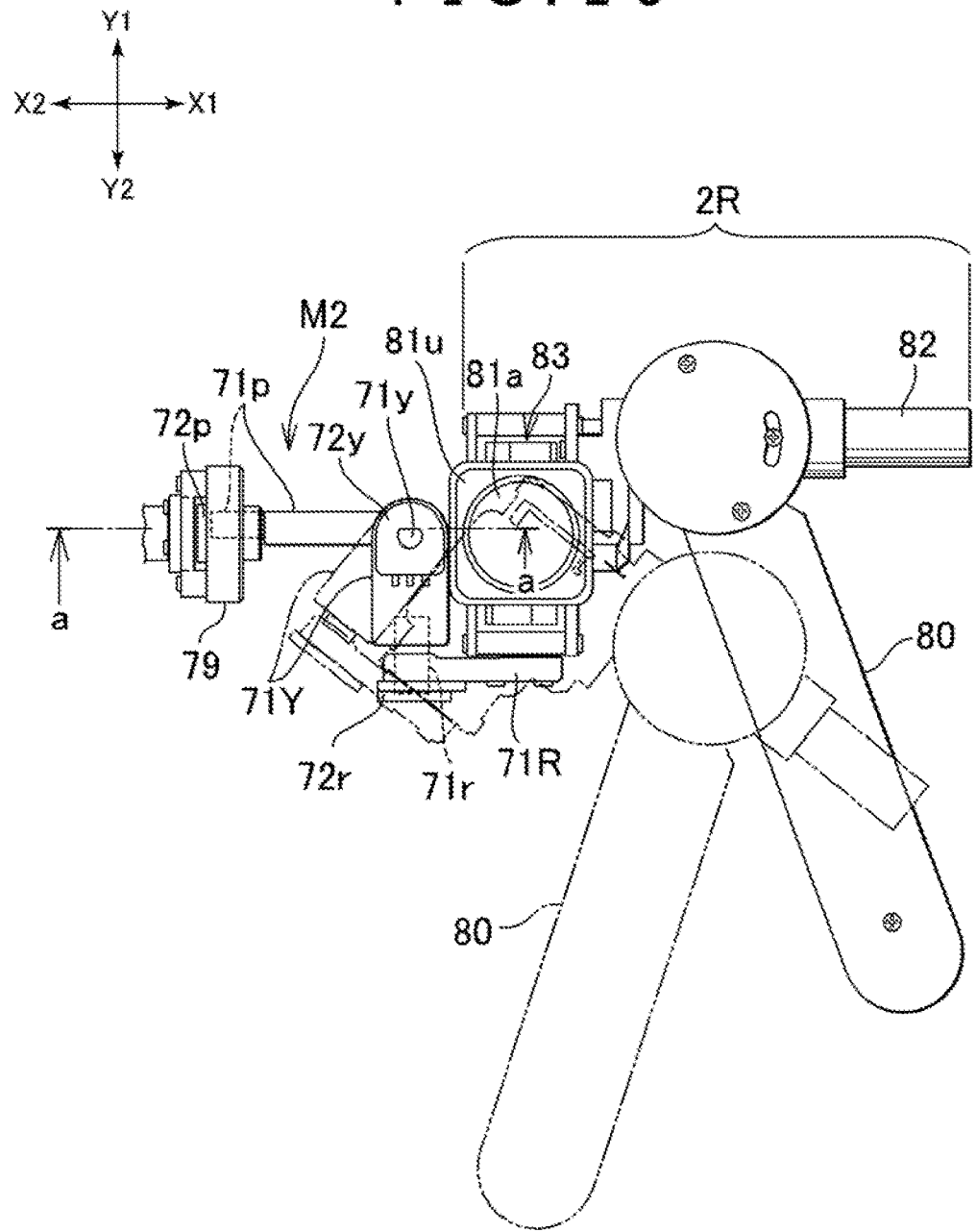
FIG. 16 is a top plan view of a rotation permission mechanism.
Figure 17:
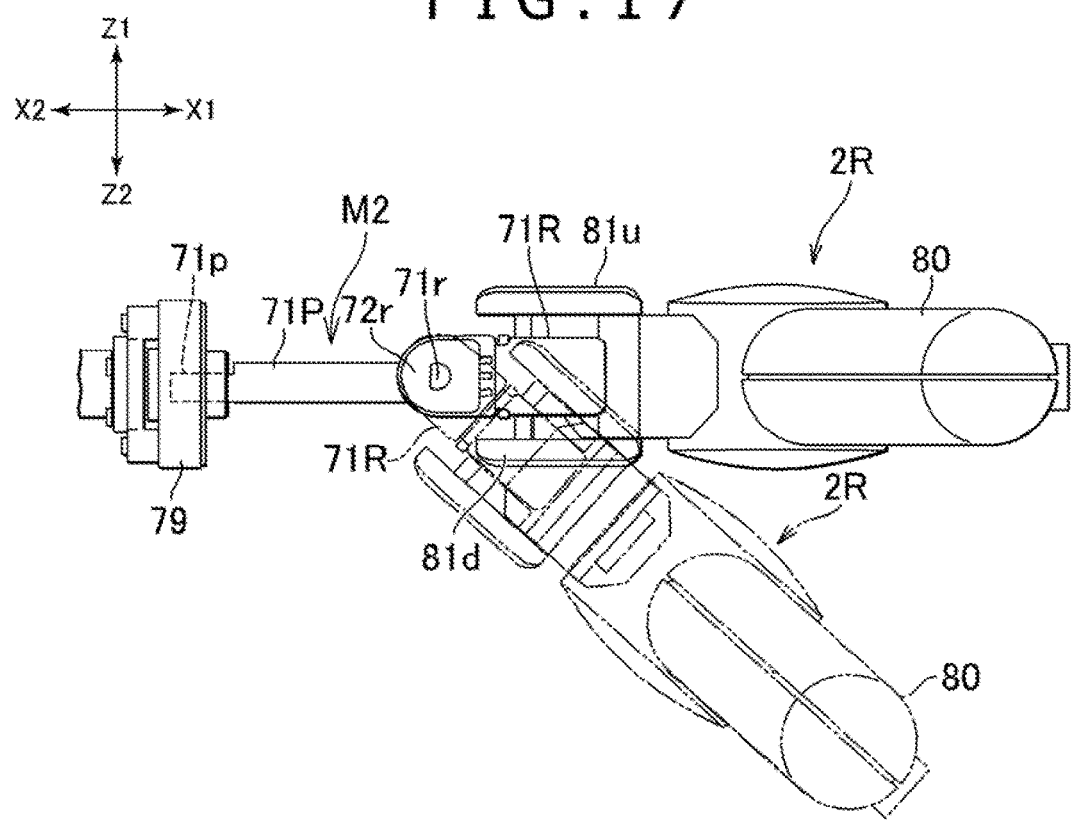
FIG. 17 is a rear elevational view of the rotation permission mechanism.
Figure 18:
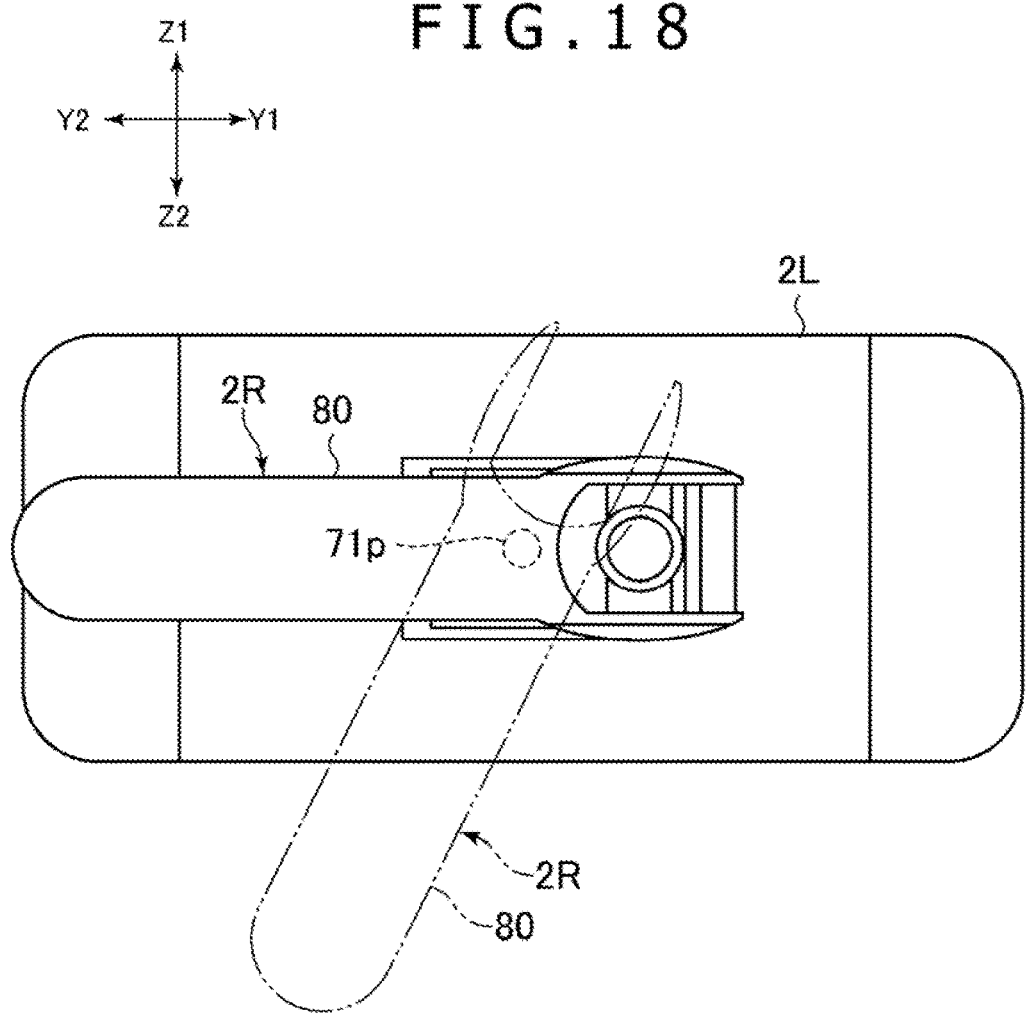
FIG. 18 is a right side elevational view of the rotation permission mechanism.

FIGS. 16 to 19 are views depicting the rotation permission mechanism M2. FIG. 16 is a top plan view, and FIG. 17 is a rear elevational view. FIG. 18 is a right side elevational view. FIG. 19 is a cross sectional view, and FIG. 19(a) is a sectional view taken along line a-a depicted in FIG. 16, and FIG. 19(b) is a sectional view taken along line b-b depicted in FIG. 19(a).

Figure 20:
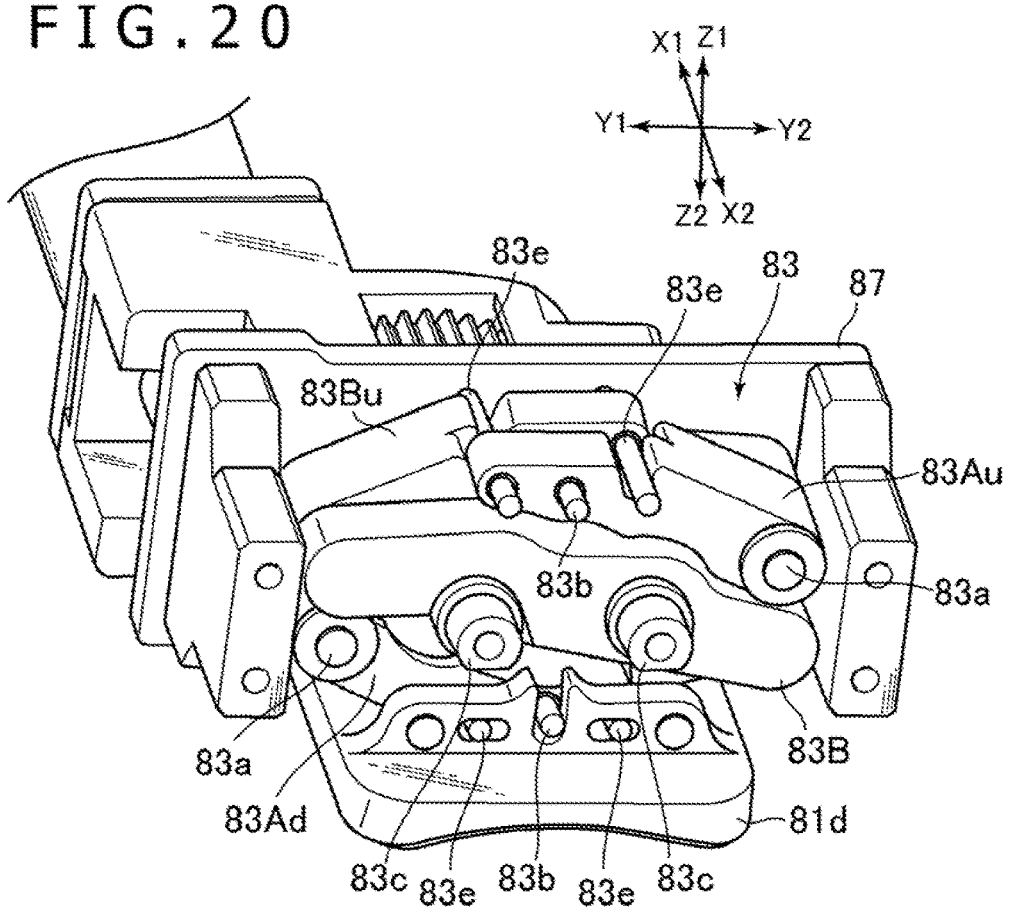
FIG. 20 is a perspective view depicting a supporting mechanism of an operation portion provided on a right holding target unit.
Figure 21:
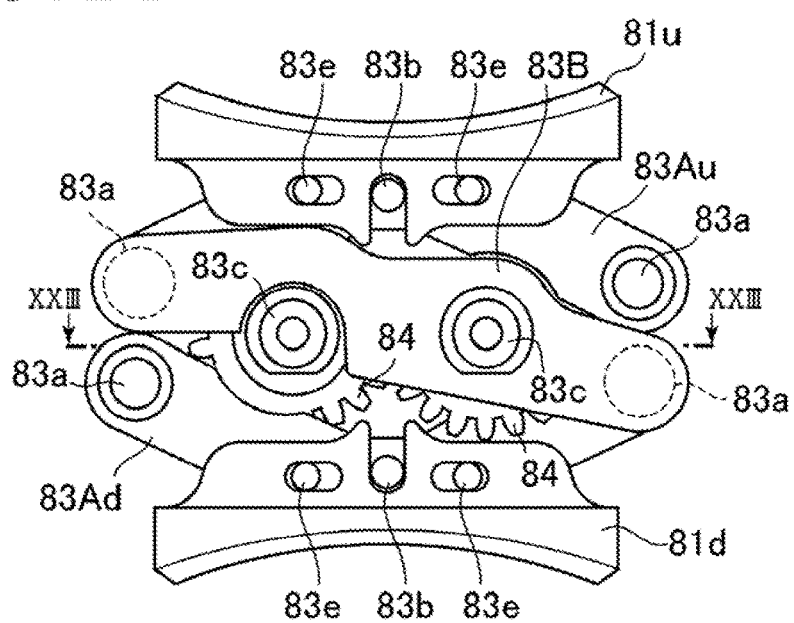
FIG. 21 is a side elevational view of the supporting mechanism.
Figure 22:
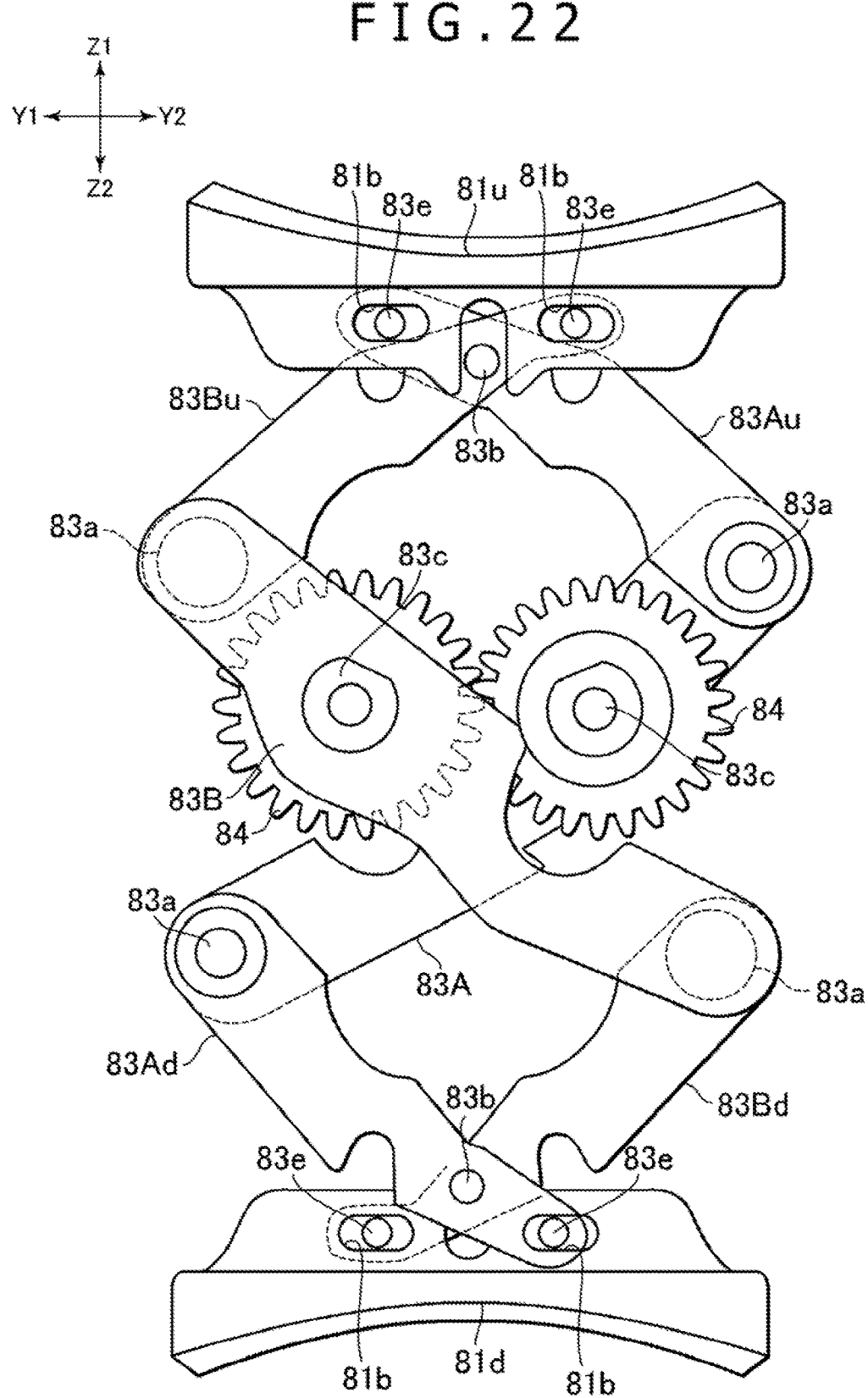
FIG. 22 is a side elevational view of the supporting mechanism depicting a state in which the operation portion is opened in an upward and downward direction.
Figure 23:
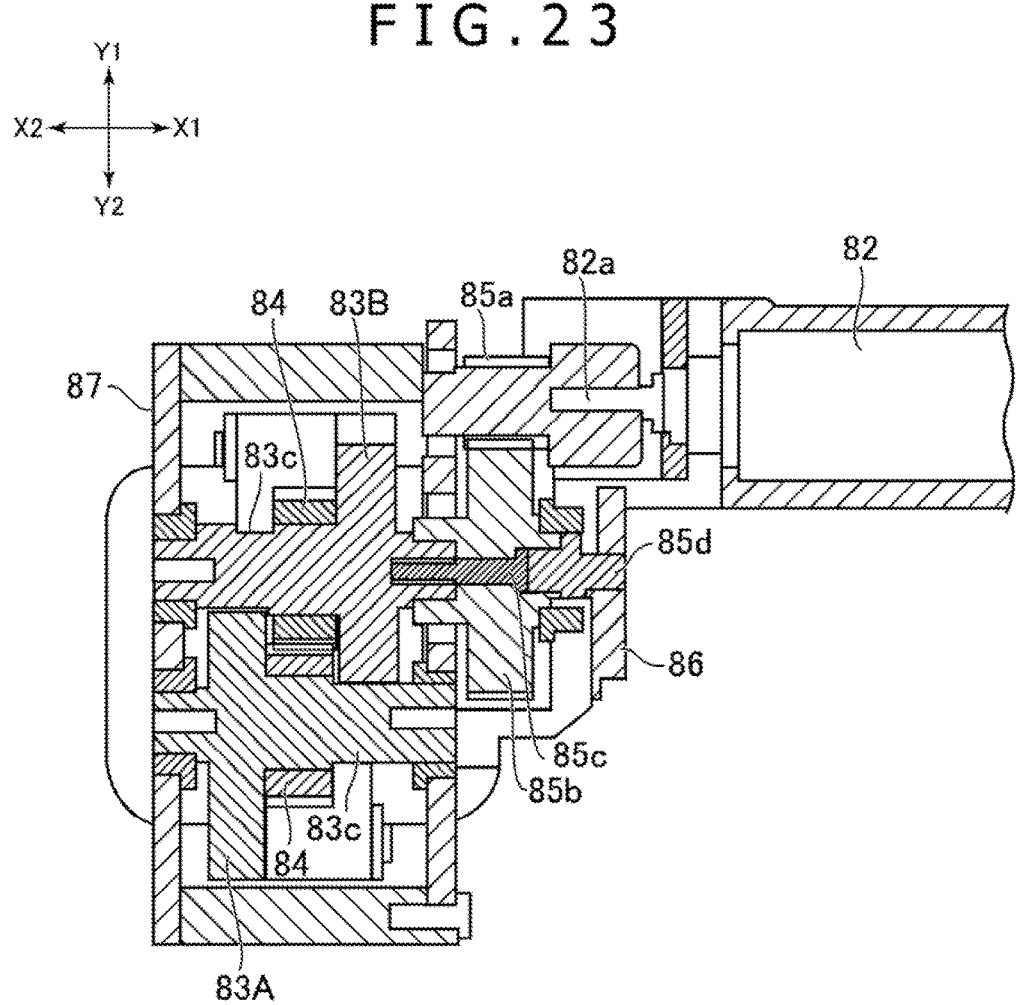
FIG. 23 is a sectional view of the right holding target unit obtained in a sectional plane represented by line XXIII-XXIII depicted in FIG. 21.

FIGS. 20 to 23 are views depicting the right holding target unit 2R. FIG. 20 is a perspective view depicting a supporting mechanism 83 for operation portions 81u and 81d provided on the right holding target unit 2R. FIG. 21 is a side elevational view of the supporting mechanism 83. FIG. 22 is a side elevational view of the supporting mechanism 83 depicting a state in which the operation portions 81u and 81d are open in an upward and downward direction. FIG. 23 is a sectional view of the right holding target unit 2R obtained along a sectional plane represented by line XXIII-XXIII depicted in FIG. 21.

In the following description, X1 and X2 depicted in FIG. 9 represented a rightward direction and a leftward direction, respectively, Y1 and Y2 a forward direction and a rearward direction, respectively; and Z1 and Z2 an upward direction and a downward direction, respectively.

As depicted in FIG. 9, the interface apparatus 2 has a left holding target unit 2L. The left holding target unit 2L is a portion for being supported by the left upper limb of a user. In the present embodiment, the left holding target unit 2L is held by the heft hand. The left holding target unit 2L may be configured such that it can be held (supported) by the left arm. The interface apparatus 2 has a right holding target unit 2R positioned in a spaced relationship in the rightward direction from the left holding target unit 2L. The right holding target unit 2R is a portion for being held by the right hand of the user. The right holding target unit 2R in the example described here has operation portions 81u and 81d (refer to FIG. 21) for being operated by fingers of the user. The holding target units 2L and 2R are connected to each other through the moving mechanism M disposed between them.

The moving mechanism M has a position changing mechanism M1 that permits change of the relative position of the right holding target unit 2R with respect to the left holding target unit 2L. The position changing mechanism M1 changes the relative position of the right holding target unit 2R with respect to the left holding target unit 2L in at least one of a forward and rearward direction, an upward and downward direction, and a leftward and rightward direction. The position changing mechanism M1 in the example described here changes the relative position of the right holding target unit 2R in all of the three above-described directions. The position changing mechanism M1 has an arm 60 and a differential apparatus 51 that supports the arm 60 as depicted in FIGS. 10 and 11. The change of the relative position in the forward and rearward direction is implemented by tilting of the arm 60 in the forward and rearward direction as depicted in FIG. 10. Meanwhile, the change of the relative position in the upward and downward direction is implemented by tilting of the arm 60 in the upward and downward direction as depicted in FIG. 11. As depicted in FIG. 12, the arm 60 has an arm main body 61, and an arm moving unit 62 movable in the leftward and rightward direction (extension direction of the arm 60) with respect to the arm main body 61. The change of the relative position of the right holding target unit 2R in the leftward and rightward direction is implemented by relative movement of the arm main body 61 and the arm moving unit 62 in the leftward and rightward direction (refer to FIG. 15). The position changing mechanism M1 may not necessarily permit relative position of the right holding target unit 2R in all of three directions orthogonal to each other.

The moving mechanism M of the example described here further has a rotation permission mechanism M2 that permits rotation of the right holding target unit 2R as depicted in FIG. 9. The rotation permission mechanism M2 allows at least one of yawing of the right holding target unit 2R (rotation around an axial line along the Z1-Z2 direction), rolling of the right holding target unit 2R (rotation around an axial line along the Y1-Y2 direction) and pitching of the right holding target unit 2R (rotation around an axial line along the X1-X2 direction) ("axial line" in the present specification is a straight line passing the center of rotation of a shaft). The rotation permission mechanism M2 in the example described here has three shaft portions 71p, 71y, and 71r having axial lines orthogonal to each other and allows all of yawing, rolling, and pitching of the right holding target unit 2R.

The yawing is implemented by rotation of a member 71Y (hereinafter referred to as yaw member) around the yaw shaft portion 71y as depicted in FIG. 16. The rolling is implemented by rotation of a member 71R (hereinafter referred to as roll member) around the roll shaft portion 71r as depicted in FIG. 17. The pitching is implemented by rotation of a member 71P (refer to FIG. 16, hereinafter referred to as pitch member) around the pitch shaft portion 71p as depicted in FIG. 18. In the description of the present embodiment, the pitch shaft portion 71p is a shaft portion having an axial line extending along the leftward and rightward direction in a state in which the right holding target unit 2R is disposed in a basic posture depicted in FIG. 9 in which the right holding target unit 2R is not rotated in any direction. The yaw shaft portion 71y and the roll shaft portion 71r are shaft portions having an axial line extending along the upward and downward direction and an axial line extending along the forward and rearward direction in the state in which the right holding target unit 2R is disposed in the basic posture. The rotation permission mechanism M2 may have only one or only two from among the three shaft portions 71p, 71y, and 71r. In other words, the rotation permission mechanism M2 may permit only one or only two from among the above-described three rotations (yawing, rolling, and pitching) of the right holding target unit 2R.

The moving mechanism M includes a portion (first portion) supported by the left holding target unit 2L and another portion (second portion) directly or indirectly connected to the right holding target unit 2R. The second portion can move relative to the first portion. By the relative movement of the second portion, change of the relative position of the right holding target unit 2R with respect to the left holding target unit 2L or rotation of the right holding target unit 2R is permitted. One example of the first portion is the differential apparatus 51 (refer to FIGS. 10 and 11) hereinafter described which is supported on the inner side of the left holding target unit 2L. Where the differential apparatus 51 is the first portion, the second portion is the arm 60 (refer to FIGS. 10 and 11) described hereinabove. Meanwhile, another example of the first portion is the arm main body 61 (refer to FIG. 15) described hereinabove. In this case, the second portion is the arm moving unit 62 that can move in the leftward and rightward direction with respect to the arm main body 61. On one of the two relatively movable portions (namely, the first portion and the second portion), a driving apparatus for moving the other (in the example described here, the motor) is provided. By operation of the motor, the relative position of the right holding target unit 2R with respect to the left holding target unit 2L changes.

As hereinafter described, a sensor for detecting a relative position or rotation of the right holding target unit 2R is provided on the moving mechanism M. The interface apparatus 2 is connected by wire or wireless connection to an information processing apparatus such as a game apparatus or a personal computer and transmits a sensor output to the information processing apparatus. In an example of a use mode of the interface apparatus 2, when the user moves the right holding target unit 2R relative to the left holding target unit 2L or when the user rotates the right holding target unit 2R, the interface apparatus 2 transmits a sensor output corresponding to the movement to the information processing apparatus, and the information processing apparatus moves an object displayed on the display apparatus.

The driving apparatus (for example, motors 52A and 52B for moving the arm 60) exerts force acting against the force by the user for moving the right holding target unit 2R or relatively moves the left holding target unit 2L with respect to the right holding target unit 2R in accordance with an instruction received from the information processing apparatus. The driving apparatus relatively moves the right holding target unit 2R, for example, when the object displayed on the display apparatus moves.

As depicted in FIG. 9, the position changing mechanism M1 and the rotation permission mechanism M2 are connected to each other. In the example described here, an attachment portion 62b provided at a rightmost portion of the arm 60 and an attachment portion 79 disposed at a leftmost portion of the rotation permission mechanism M2 are attached to each other through a connection member 69. The position changing mechanism M1 is disposed on the left holding target unit 2L side, and the rotation permission mechanism M2 is disposed on the right holding target unit 2R side. In other words, the right holding target unit 2R is connected to a rightmost portion of the position changing mechanism M1 through the rotation permission mechanism M2, and the left holding target unit 2L is provided on the left side of the position changing mechanism M1. By this layout of the position changing mechanism M1 and the rotation permission mechanism M2, when the user rotates the right holding target unit 2R, change of the relative position of the right holding target unit 2R with respect to the left holding target unit 2L can be suppressed. In other words, the right holding target unit 2R can be rotated (changed in posture) without tilting the arm 60 or without causing relative movement of the arm main body 61 and the arm moving unit 62.

The position changing mechanism M1 has the arm 60 and the differential apparatus 51 as described hereinabove. Further, the position changing mechanism M1 has motors 52A and 52B for moving (tilting) the arm 60 through the differential apparatus 51 as depicted in FIG. 10. The motors 52A and 52B are, for example, geared motors having a built-in reduction gear. Further, the position changing mechanism M1 has a frame 50 that supports a rotational shaft configuring the differential apparatus 51 and the motors 52A and 52B.

As depicted in FIG. 14, the differential apparatus 51 has rotational shafts 51A and 51B. The rotational shafts 51A and 51B are disposed on the same axis. The two rotational shafts 51A and 51B are disposed perpendicularly to the arm 60. In particular, the arm 60 is disposed along the leftward and rightward direction, and the rotational shafts 51A and 51B are disposed such that the axial line thereof extends along the forward and rearward direction. The rotational shafts 51A and 51B are supported on two side walls 50a provided on the frame 50. The rotational shafts 51A and 51B have a bevel gear 51a at an inner side end portion thereof. The differential apparatus 51 has a rotational shaft 51C having an axial line orthogonal to the rotational shafts 51A and 51B. On the rotational shaft 51C, a bevel gear 51b is formed which engages with the gears 51a of the rotational shafts 51A and 51B. Further, on the rotational shaft 51C, a bevel gear 51d is fitted which is relatively freely rotatable with respect to the rotational shaft 51C. The rotational shaft 51C is supported at an upper portion and a lower portion thereof for rotation by a case 51D.

Rotary shafts of the motors 52A and 52B are connected to rotational shafts 51A and 51B of the differential apparatus 51. As depicted in FIG. 13, the rotational shafts of the motors 52A and 52B are connected to the rotational shafts 51A and 51B, respectively, for example, through belts 53c. A pulley 53a is attached to an end portion of each of the rotational shafts 51A and 51B. A pulley 53b is attached also to the rotational shaft of each of the motors 52A and 52B. The belts 53c are wrapped around the pulleys 53a and 53b. It is to be noted that the rotational shafts of the motors 52A and 52B and the rotational shafts 51A and 51B of the differential apparatus 51 may be connected to each other by a plurality of gears.

The arm 60 is attached to the rotational shaft 51C such that it integrally rotates with the rotational shaft 51C of the differential apparatus 51. The rotational shaft 51C has an upper end 51e projecting upwardly from the case 51D and a lower end 51f projecting downwardly from the case 51D (refer to FIGS. 13 and 14). The arm main body 61 in the example described here has at a base portion thereof two connection portions 63d opposing to each other in the upward and downward direction (refer to FIG. 12). The connection portions 63d are attached to the upper end 51e and the lower end 51f of the rotational shaft 51C such that they cannot rotate relative to the rotational shaft 51C.

When the rotational shafts 51A and 51B rotate in the opposite directions to each other (when the motors 52A and 52B rotate in the opposite directions to each other), the rotational shaft 51C rotates around an axial line thereof. As a result, the arm 60 is tilted forwardly or rearwardly around the rotational shaft 51C as depicted in FIG. 10. Consequently, the right holding target unit 2R moves forwardly or rearwardly relative to the left holding target unit 2L. When the rotational shafts 51A and 51B rotate at an equal speed in the same direction (when the motors 52A and 52B rotate at an equal speed in the same direction), the rotational shaft 51C and the case 51D are tilted around the axial line of the rotational shafts 51A and 51B. As a result, the arm 60 is tilted upwardly or downwardly around the axial line of the rotational shafts 51A and 51B as depicted in FIG. 11. Consequently, the right holding target unit 2R moves upwardly or downwardly relative to the left holding target unit 2L.

In this manner, relative movement of the right holding target unit 2R in the upward and downward direction and the forward and rearward direction with respect to the left holding target unit 2L is implemented by the tilting of the arm 60 in the upward and downward direction and the forward and rearward direction. Consequently, it is possible to assure the movable range of the right holding target unit 2R while upsizing of the left holding target unit 2L is suppressed. For example, the movable range of the right holding target unit 2R can be increased by making the arm 60 longer.

Further, in the example described here, the differential apparatus 51 is used in order to tilt the arm 60 in the upward and downward direction and the forward and rearward direction. Consequently, upsizing of the left holding target unit 2L can be suppressed. Further, by using the differential apparatus 51, the base portion of the arm 60 (portion attached to the rotational shaft 51C) can be positioned at the center of the left holding target unit 2L in the forward and rearward direction. As a result, balancing between the weight of the front side and the weight of the rear side of the left holding target unit 2L can be anticipated.

In order to implement relative movement of the right holding target unit 2R in the forward and rearward direction, a mechanism for translating the arm 60 in the forward and rearward direction may be provided on the interface apparatus 2. The translation of the arm 60 can be implemented by various mechanisms. As an example, a rack may be provided at a base portion of the arm 60 while a pinion gear connected to the rotational shaft of a motor is disposed on the left holding target unit 2L. Similarly, in order to implement relative movement of the right holding target unit 2R in the upward and downward direction, the interface apparatus 2 may include a mechanism for translating the arm 60 in the upward and downward direction. Further, the mechanisms for tilting the arm 60 in the upward and downward direction and the forward and rearward direction are not necessarily configured from a differential apparatus.

As described hereinabove, the differential apparatus 51 is supported by the left holding target unit 2L. Also the motors 52A and 52B are supported by the left holding target unit 2L similarly to the differential apparatus 51. With such a layout of the motors 52A and 52B and the differential apparatus 51 as just described, the force required to support the right holding target unit 2R by the user can be made lower than the force required to support the left holding target unit 2L. As a result, the operability of the interface apparatus 2 by the right hand can be improved. In particular, rotation of the right holding target unit 2R and operation of the operation portions 81u and 81d hereinafter described which are provided on the right holding target unit 2R are facilitated. Further, by this layout of the motors 52A and 52B, the user can acutely feel the force acting upon the right holding target unit 2R and a movement of the right holding target unit 2R. Especially, in the example described here, the differential apparatus 51 and the motors 52A and 52B are disposed on the inner side of the case 2a (refer to FIG. 9) that configures an outer profile of the left holding target unit 2L. Therefore, the force required to support the right holding target unit 2R by the user can be made lower in comparison with the force required to support the left holding target unit 2L.

As depicted in FIG. 10, the motors 52A and 52B are disposed on the left side of the differential apparatus 51. In other words, the motors 52A and 52B are located nearer to an end portion of the interface apparatus 2 in the leftward and rightward direction than the differential apparatus 51. With this layout of the motors 52A and 52B, the force required to support the right holding target unit 2R by the user can be made further lower than the force required to support the left holding target unit 2L. The motors 52A and 52B are juxtaposed with each other in the upward and downward direction. In other words, the motors 52A and 52B are disposed in an overlapping relationship with each other when the left holding target unit 2L is viewed in plan.

Therefore, the space in the case 2a of the left holding target unit 2L can be utilized effectively.

Further, the motors 52A and 52B are disposed such that the rotational shafts thereof and the rotational shafts of the rotational shafts 51A and 51B of the differential apparatus 51 extend in parallel to each other. Further, the two motors 52A and 52B are disposed such that the rotational shafts thereof are positioned on the opposite sides to each other. In particular, the rotational shaft of the motor 52A is positioned on the front side of the left holding target unit 2L while the rotational shaft of the motor 52B is positioned on the rear side of the left holding target unit 2L. With this layout, the structure for connecting the rotational shafts of the motors 52A and 52B and the rotational shafts 51A and 51B of the differential apparatus 51 to each other can be simplified.

The layout of the motors 52A and 52B is not limited to that described above. For example, the motors 52A and 52B may be disposed on the upper side or the lower side of the differential apparatus 51. Alternatively, the motors 52A and 52B may be disposed such that the rotational shafts thereof extend perpendicularly to the rotational shafts 51A and 51B of the differential apparatus 51.

The differential apparatus 51 has provided thereon sensors for detecting a relative position of the right holding target unit 2R in the forward and rearward direction and the upward and downward direction with respect to the left holding target unit 2L. In the example described here, rotation sensors 54 for outputting a signal corresponding to rotational angles of the rotational shafts 51A and 51B of the differential apparatus 51 are attached to the rotational shafts 51A and 51B as depicted in FIGS. 13 and 10. Tilting angles of the arm 60 in the forward and rearward direction and the upward and downward direction, namely, a relative position of the right holding target unit 2R with respect to the left holding target unit 2L, can be detected on the basis of outputs of the rotation sensors 54. The rotation sensors 54 are configured, for example, from a potentiometer or a rotary encoder.

As described hereinabove, the arm 60 has the arm main body 61 connected to the differential apparatus 51. As depicted in FIG. 12, the arm main body 61 in the example described here has a worm 61a disposed along the leftward and rightward direction, and a plurality of guide rods 61c disposed in parallel to the worm 61a. Further, the arm main body 61 has a frame 63. The frame 63 supports the opposite end portions of the worm 61a and the opposite end portions of the guide rods 61c. In particular, the frame 63 has a first supporting portion 63a positioned on the left holding target unit 2L side and a second supporting portion 63b positioned on the right holding target unit 2R side. One end portion of the worm 61a and one end portion of the guide rods 61c are supported by the first supporting portion 63a. The other end portion of the worm 61a and the other end portion of the guide rods 61c are supported by the second supporting portion 63b. The supporting portions 63a and 63b support the opposite end portions of the worm 61a for rotation. The two supporting portions 63a and 63b are connected to each other by a frame main body 63c. Further, the frame 63 has a connection portion 63d attached to the rotational shaft 51C of the differential apparatus 51.

As described hereinabove, the arm 60 has the arm moving unit 62. The arm moving unit 62 is relatively movable in the leftward and rightward direction with respect to the arm main body 61 and is connected to the right holding target unit 2R through the rotation permission mechanism M2. As depicted in FIG. 12, the arm moving unit 62 in the example described here has a worm engaging portion 62a at one end portion (end portion on the left holding target unit 2L side) thereof. A hole in which the worm engaging portion 62a is fitted is formed in the warm 61a is fitted, and a screw groove for engaging with the worm engaging portion 62a is formed on an inner circumferential face of the hole. Also a hole into which the guide rod 61c is inserted is formed in the worm engaging portion 62a. Therefore, when the worm 61a rotates, the arm moving unit 62 moves in the leftward and rightward direction along the guide rod 61c.

As depicted in FIG. 12, the arm moving unit 62 has the attachment portion 62b at the other end portion (end portion on the right holding target unit 2R side) thereof. As described hereinabove, the attachment portion 79 of the rotation permission mechanism M2 is attached to the attachment portion 62b through the connection member 69 (refer to FIG. 9). Therefore, when the worm 61a rotates, the right holding target unit 2R relatively moves in the leftward and rightward direction with respect to the left holding target unit 2L. The attachment portion 62b and the worm engaging portion 62a are fixed to each other by a plurality of connection rods 62c extending in parallel to the worm 61a. The second supporting portion 63b of the frame 63 is positioned between the attachment portion 62b and the worm engaging portion 62a. Holes in which the connection rods 62c are fitted are formed on the second supporting portion 63b.

The interface apparatus 2 has a motor 64 that moves the arm moving unit 62, namely, rotates the worm 61a. The motor 64 is provided at a portion of the arm main body 61 on the left holding target unit 2L side. In the example described here, the motor 64 is attached to the first supporting portion 63a (left side supporting portion) of the frame 63 as depicted in FIG. 12. By this layout of the motor 64, the force required to support the right holding target unit 2R by the user can be made lower than the force required to support the left holding target unit 2L. As a result, the operability of the interface apparatus 2 by the right hand can be improved. In particular, rotation of the right holding target unit 2R and operation of the operation portions 81u and 81d hereinafter described provided on the right holding target unit 2R are facilitated. Further, by the layout of the motor 64, the user can acutely feel the force acting upon the right holding target unit 2R or a movement of the right holding target unit 2R.

In the example described here, a mechanism for imparting rotation of the rotary shaft 64a of the motor 64 to an end portion of the worm 61a is disposed in the inside of the first supporting portion 63a. In particular, a plurality of gears for imparting rotation of the rotary shaft 64a to the worm 61a are provided on the first supporting portion 63a. More particularly, a first gear 64b is attached to the rotary shaft 64a as depicted in FIG. 15. A third gear 64d is attached to an end portion of the worm 61a. A second gear 64c that engages with both of the first gear 64b and the third gear 64d is disposed between the two gears 64b and 64d. Rotation of the motor 64 is imparted in a reduced speed to the worm 61a by the three gears 64b, 64c, and 64d. The mechanism for imparting rotation of the motor 64 to the worm 61a may be changed suitably. Also the mechanism for moving the arm moving unit 62 may be changed suitably. In other words, the mechanism for moving the arm moving unit 62 may not necessarily include the worm 61a.

A sensor for detecting the relative position of the right holding target unit 2R in the leftward and rightward direction with respect to the left holding target unit 2L is provided on the arm 60. In the example described here, the motor 64 has a built-in rotation sensor for detecting rotation of the rotational shaft 64a. The relative position of the right holding target unit 2R in the leftward and rightward direction can be detected on the basis of an output of the rotation sensor.

As described hereinabove, the rotation permission mechanism M2 has the pitch shaft portion 71p, the yaw shaft portion 71y, and the roll shaft portion 71r. As depicted in FIG. 16, the rotation permission mechanism M2 has a pitching member 71P that rotates around the pitch shaft portion 71p. The rotation permission mechanism M2 has a yawing member 71Y that is connected to the yaw shaft portion 71y and rotates around the yaw shaft portion 71y. The rotation permission mechanism M2 has a rolling member 71R that is connected to the roll shaft portion 71r and rotates around the roll shaft portion 71r.

An axial line of the yaw shaft portion 71y and an axial line of the roll shaft portion 71r extend in the upward and downward direction and the forward and rearward direction, respectively. Therefore, if the distances between the shaft portions 71y and 71r and the right holding target unit 2R in the leftward and rightward direction are set great, then also the positional change of the right holding target unit 2R caused by rotation of the right holding target unit 2R around the shaft portions 71y and 71r is great. In contrast, since the axial line of the pitch shaft portion 71p extends along the leftward and rightward direction, even if the distance between the pitch shaft portion 71p and the right holding target unit 2R in the leftward and rightward direction is set great (for example, even if the pitch shaft portion 71p is elongated in the leftward and rightward direction), a positional change of the right holding target unit 2R caused by rotation of the right holding target unit 2R around the pitch shaft portion 71p is less likely to occur. Therefore, in the example described here, the yaw shaft portion 71y and the roll shaft portion 71r are disposed rather near to the right holding target unit 2R than the pitch shaft portion 71p as depicted in FIG. 16. In other words, the right holding target unit 2R is connected to the pitching member 71P and the pitch shaft portion 71p through the rolling member 71R, the roll shaft portion 71r, the yawing member 71Y, and the yaw shaft portion 71y. With such a layout of the three shaft portions 71p, 71y, and 71r as just described, the distance from the right holding target unit 2R to the axial line of the yaw shaft portion 71y and the distance from the right holding target unit 2R to the axial line of the roll shaft portion 71r can be made short. Therefore, the positional change of the right holding target unit 2R caused by rotation of the right holding target unit 2R around the shaft portions 71y and 71r can be reduced.

The pitching member 71P in the example described here is a bar-like member disposed along the leftward and rightward direction as depicted in FIG. 16. The pitch shaft portion 71p is provided at a left end portion of the pitching member 71P (refer to FIG. 19(a)). The pitching member 71P is positioned on the axial line of the pitch shaft portion 71p. The right holding target unit 2R is positioned in the direction of the axial line (rightward direction) with respect to the pitch shaft portion 71p. More particularly, the operation portions 81u and 81d hereinafter described are positioned in the direction of the axial line with respect to the pitch shaft portion 71p. Therefore, as depicted in FIG. 18, the position of the right holding target unit 2R when the right holding target unit 2R is rotated around the pitch shaft portion 71p can be suppressed from changing.

As depicted in FIG. 19(a), the pitch shaft portion 71p is supported for rotation by the attachment portion 79. Bearings 73 are attached to the outer side of the pitch shaft portion 71p. A rotation sensor 72p for detecting the rotational angle of the pitch shaft portion 71p is attached to the attachment portion 79. The rotation sensor 72p is configured, for example, from a potentiometer or a rotary encoder. It is to be noted that, to the pitch shaft portion 71p depicted in FIG. 19(a), a screw 79a for preventing the pitch shaft portion 71p from coming off from the attachment portion 79 is attached. As described hereinabove, the attachment portion 79 is attached to the attachment portion 62b of the arm 60 through the connection member 69. The connection member 69 may have a built-in sensor which detects internal force (torque) acting between a member disposed on the right side of the connection member 69 (in the example described here, the attachment portion 79) and a member disposed on the left side of the connection member 69 (in the example described here, the attachment portion 62b). In this case, the motors 52A and 52B for moving the arm 60 and the motor 64 for moving the arm moving unit 62 may be driven on the basis of an output value of the sensor.

As depicted in FIG. 19, the pitching member 71P in the example described here has the yaw shaft portion 71y at a right end portion thereof. The yawing member 71Y is connected to the yaw shaft portion 71y through the bearings 73 and is supported for rotation by the yaw shaft portion 71y. The yawing member 71Y extends in a radial direction from the yaw shaft portion 71y. In the example described here, the yawing member 71Y extends rearwardly from the yaw shaft portion 71y (refer to FIG. 16). The layout of the yawing member 71Y is not limited to this, but the yawing member 71Y may extend, for example, forwardly from the yaw shaft portion 71y.

The roll shaft portion 71r is provided at an end portion of the yawing member 71Y. In the example described here, the roll shaft portion 71r in the example depicted in FIG. 19(b) is attached to an end portion of the yawing member 71Y by a screw 71b. The rolling member 71R is connected to the roll shaft portion 71r through the bearings 73 and is supported for rotation by the roll shaft portion 71r. The rolling member 71R extends in a radial direction from the roll shaft portion 71r. The rolling member 71R in the example described here extends in the rightward direction from the roll shaft portion 71r.

The right holding target unit 2R is attached to the rolling member 71R. The attachment position of the right holding target unit 2R to the rolling member 71R is set such that the right holding target unit 2R is positioned near to the yaw shaft portion 71y. In the example described here, since the yawing member 71Y extends rearwardly from the yaw shaft portion 71y, the right holding target unit 2R is attached to the front side of the rolling member 71R. With the attachment structure of the right holding target unit 2R, the distance between the right holding target unit 2R and the axial line of the yaw shaft portion 71y is small. As a result, the position of the right holding target unit 2R can be suppressed from being changed by rotation of the right holding target unit 2R around the yaw shaft portion 71y.

As depicted in FIG. 16, a rotation sensor 72y for detecting a rotational angle of the yawing member 71Y with respect to the yaw shaft portion 71y is attached to the yawing member 71Y. Further, as depicted in FIG. 17, a rotation sensor 72r for detecting a rotational angle of the rolling member 71R with respect to the roll shaft portion 71r is attached to the rolling member 71R. The rotation sensors 72y and 72r are configured, for example, from a potentiometer or a rotary encoder.

The arrangement of the yaw shaft portion 71y and the roll shaft portion 71r may be reversed. In other words, the roll shaft portion 71r may be provided at an end portion of the pitching member 71P in place of the yaw shaft portion 71y. Further, the rolling member 71R may be attached to the pitching member 71P through the roll shaft portion 71r. In this case, the yaw shaft portion 71y may be provided at an end portion of the rolling member 71R, and the yawing member 71Y may be connected to the roll shaft portion 71r through the yaw shaft portion 71y. In this case, preferably the attachment position of the right holding target unit 2R to the yawing member 71Y is set so that the right holding target unit 2R may come near to the axial line of the roll shaft portion 71r. By this, it can be suppressed that the position of the right holding target unit 2R is changed by rotation of the right holding target unit 2R around the roll shaft portion 71r.

The structures for implementing yawing and rolling of the right holding target unit 2R are not limited to those in the example described above. The rotation permission mechanism M2 may include a frame that supports the opposite end portions of one of the yaw shaft portion and the roll shaft portion. The frame may be supported by the opposite end portions of the other shaft portion while the right holding target unit 2R may be supported by the one shaft portion supported by the frame. For example, the frame supports the opposite end portions of the yaw shaft portion, and the right holding target unit 2R is supported by the yaw shaft portion. In this case, the roll shaft portion supports the frame.

The rotation permission mechanism M2 may include driving apparatus (for example, motors) for rotating the right holding target unit 2R around the shaft portions 71p, 71r, and 71y. In particular, a driving apparatus for rotating the pitching member 71P around the pitch shaft portion 71p may be attached to one of the attachment portion 79 and the pitching member 71P. Meanwhile, a driving apparatus for rotating the yawing member 71Y around the yaw shaft portion 71y may be attached to one of the pitching member 71P and the yawing member 71Y. Further, a driving apparatus for rotating the rolling member 71R around the roll shaft portion 71r may be attached to one of the yawing member 71Y and the rolling member 71R.

As described hereinabove, the right holding target unit 2R has the operation portions 81u and 81d for being operated with fingers by the user. The right holding target unit 2R in the example described here has two operation portions 81u and 81d (refer to FIGS. 16 and 17). Further, the right holding target unit 2R has a grip 80 for being gripped with a hand. The grip 80 is positioned on the outer side of the operation portions 81u and 81d in the leftward and rightward direction. Here, the grip 80 in the example described here is positioned on the right side of the operation portions 81u and 81d and disposed so as to extend obliquely rearwardly.

In the example described here, the operation portions 81u and 81d are disposed on the upper side and the lower side of the right holding target unit 2R, respectively. The user can pinch the two operation portions 81u and 81d, for example, with the thumb and the index finger. A force sensor 81a (refer to FIG. 16) is provided on the surface of the operation portions 81u and 81d. As depicted in FIGS. 20 and 21, the right holding target unit 2R has the supporting mechanism 83 for supporting the operation portions 81u and 81d (in FIG. 20, the operation portion 81u is removed). The supporting mechanism 83 is configured such that the operation portions 81u and 81d are moved in the opposite directions to each other (refer to FIG. 22). In particular, if the operation portion 81u moves upwardly, then the operation portion 81d moves downwardly. Further, the supporting mechanism 83 is configured such that the operation portions 81u and 81d move in parallel. The right holding target unit 2R includes a motor 82 (refer to FIG. 23) that is a driving apparatus for moving the operation portions 81u and 81d through the supporting mechanism 83.

The number of operation portions 81u and 81d may be changed suitably. Further, the operation portions 81u and 81d can be positioned and moved in various manners. For example, the number of operation portions may be one. Alternatively, the number of operation portions may be three or four. In this case, the operation portions may be provided on the front side of the right holding target unit 2R. Meanwhile, the movement of each operation portion is not limited particularly to parallel movement in the upward and downward direction. For example, the right holding target unit 2R may include, as the operation portions, sticks which can be tilted or slidably moved in the forward and rearward direction and/or the leftward and rightward direction. Further, on the right holding target unit 2R, buttons may be provided as the operation portions. Where the operation portions are sticks or buttons, the motor 82 that is a driving apparatus may not be provided on the right holding target unit 2R.

As depicted in FIG. 22, the supporting mechanism 83 in the example described here has two supporting arms 83Au and 83Bu that support the operation portion 81u. The supporting arms 83Au and 83Bu have a shaft 83a at a base portion thereof. The two supporting arms 83Au and 83Bu are disposed so as to cross with each other and are connected at intermediate portions (crossing portions) thereof to each other by a shaft 83b. The operation portion 81u is attached to end portions of the two supporting arms 83Au and 83Bu. The supporting mechanism 83 has two supporting arms 83Ad and 83Bd that support the operation portion 81d. The layout of the supporting arms 83Ad and 83Bd is generally similar to that of the supporting arms 83Au and 83Bu. In particular, the two supporting arms 83Ad and 83Bd are disposed so as to cross with each other and are connected at intermediate portions (crossing portions) thereof by a shaft 83b. The operation portion 81d is attached to end portions of the two supporting arms 83Ad and 83Bd.

The supporting mechanism 83 has two connection arms 83A and 83B. As depicted in FIGS. 22 and 23, the two connection arms 83A and 83B have a shaft portion 83c at an intermediate portion thereof. The shaft portion 83c is supported for rotation by a frame 87. A gear 84 is attached to the shaft portion 83c of each of the connection arms 83A and 83B. The gear 84 attached to the shaft portion 83c of the connection arm 83A and the gear 84 attached to the shaft portion 83c of the connection arm 83B mesh with each other. The connection arms 83A and 83B pivot integrally with the gears 84 attached thereto. The connection arm 83A is connected at the opposite end portions thereof to the shaft 83a of the supporting arm 83Au and the shaft 83a of the supporting arm 83Ad. The connection arm 83B is connected at the opposite end portions thereof to the shaft 83a of the supporting arm 83Bu and the shaft 83a of the supporting arm 83Bd.

The gear 84 is provided on each of the two connection arms 83A and 83B, and the two gears 84 mesh with each other. Therefore, when the gear 84 of the connection arm 83B rotates in a state in which the two operation portions 81u and 81d are positioned closely to each other as depicted in FIG. 21, both of the connection arms 83A and 83B are pivoted around the shaft portions 83c. As a result, both of the connection arms 83A and 83B are erected uprightly as depicted in FIG. 22. Since the supporting arms 83Au and 83Bu are connected to each other by the shafts 83b, when both of the supporting arms 83A and 83B are erected uprightly, the supporting arms 83Au and 83Bu are erected upwardly around the shafts 83a. Consequently, the operation portion 81u moves upwardly. Similarly, since the supporting arms 83Ad and 83Bd are connected to each other by the shafts 83b, when both of the connection arms 83A and 83B are erected uprightly, the supporting arms 83Ad and 83Bd are tilted downwardly around the shafts 83a. Consequently, the operation portion 81d moves downwardly. When the gear 84 of the connection arm 83B rotates in the reverse direction later, the state illustrated in FIG. 21 is restored from the state depicted in FIG. 22.

It is to be noted that two elongated holes 81b are formed on the operation portion 81u as depicted in FIG. 22. A shaft 83e provided at an end portion of each of the supporting arms 83Au and 83Bu extends through each of the two elongated holes 81b. When the supporting arms 83Au and 83Bu move in the upward and downward direction, the shafts 83e move on the inner side of the elongated holes 81b. Similarly, two elongated holes 81b are formed also in the operation portion 81d. A shaft 83e provided at an end portion of each of the supporting arms 83Rd and 83Bd extends through each of the two elongated holes 81b.

The shaft portion 83c of one of the two connection arms 83A and 83B is connected to the rotary shaft 82a of the motor 82. In the example described here, a rotary shaft 82a is connected to the shaft portion 83c of the connection arm 83B through a plurality of gears as depicted in FIG. 23. In particular, a first gear 85a that rotates integrally with the rotary shaft 82a is attached to the rotary shaft 82a. A second gear 85b engages with the first gear 85a. The second gear 85b is disposed coaxially with the shaft portion 83c of the connection arm 83B. The second gear 85b is connected to the connection arm 83B through a connection member 85 such that the second gear 85b and the shaft portion 83c rotate integrally with each other.

A rotation sensor 86 for detecting the rotational angle of the rotary shaft 82a of the motor 82, namely, the position of the operation portions 81u and 81d, is provided on the right holding target unit 2R. In the example depicted in FIG. 23, the right holding target unit 2R has a rotational member 85d that is disposed coaxially with the second gear 85b and rotates integrally with the second gear 85b. The rotational member 85d is attached to the rotation sensor 86.

As described above, the position changing mechanism M1 has the differential apparatus 51 supported on the inner side of the left holding target unit 2L, and an arm 60 to which the right holding target unit 2R is connected through the rotation permission mechanism M2. The motors 52A and 52B are provided on the differential apparatus 51 and are supported on the inner side of the left holding target unit 2L together with the differential apparatus 51. By the configuration, the left holding target unit 2L can be made heavier than the right holding target unit 2R. As a result, the force required to support the right holding target unit 2R by the user can be made lower than the force required to support the left holding target unit 2L. Further, the arm main body 61 is connected to the differential apparatus 51. The arm moving unit 62 is connected to the right holding target unit 2R through the rotation permission mechanism M2. The motor 64 that moves the arm moving unit 62 is attached to the arm main body 61. Also by this layout of the motor 64, the force required to support the right holding target unit 2R by the user can be made lower than the force required to support the left holding target unit 2L.

In this manner, the left holding target unit 2L, right holding target unit 2R, and moving mechanism M are configured such that the force required to support the right holding target unit 2R can be made lower than the force required to support the left holding target unit 2L. As a result, the user can use the left holding target unit 2L as a base of the interface apparatus 2 and can acutely feel force acting upon the right holding target unit 2R by driving of the motors 52A, 52B, and 64.

It is to be noted that the parts that configure the left side portion of the interface apparatus 2 (particularly, the differential apparatus 51 and the arm 60) and the parts that configure the right side portion of the interface apparatus 2 (particularly, the rotation permission mechanism M2 and the supporting mechanism 83 for the operation portions 81u and 81d) may be configured from materials different from each other such that the force required to support the right holding target unit 2R can be made lower than the force required to support the left holding target unit 2L. For example, the differential apparatus 51 may be configured from a metal material while the supporting mechanism 83 and the rotation permission mechanism M2 may be formed from a resin material.

The rotation permission mechanism M2 has a shaft portion (particularly the yaw shaft portion 71y) having an axial line perpendicular to the leftward and rightward direction as described hereinabove. The distance from the right holding target unit 2R to the yaw shaft portion 71y is smaller than the distance from the left holding target unit 2L to the yaw shaft portion 71y. Further, the moment of inertia which the right holding target unit 2R has with respect to the yaw shaft portion 71y is smaller than the moment of inertia which the left holding target unit 2L has with respect to the yaw shaft portion 71y. From this, where a driving apparatus (for example, the motor) for rotating the yawing member 71Y around the yaw shaft portion 71y is provided on the rotation permission mechanism M2, the force to act upon the right holding target unit 2R can made higher than the force to act upon the left holding target unit 2L.

Further, the size of the left holding target unit 2L is greater than that of the right holding target unit 2R. In the example described here, the left holding target unit 2L substantially is a parallelepiped while the grip 80 of the right holding target unit 2R has a form of a bar thinner than the left holding target unit 2L. Also by such asymmetry in size, the user can use the left holding target unit 2L as the base of the interface apparatus 2. As a result, the user can acutely feel the force acting upon the right holding target unit 2R by driving of the motors 52A, 52B, and 64.

As described above, the interface apparatus 2 includes the differential apparatus 51 and the arm 60 that can move relative to the differential apparatus 51, and the motors 52A and 52B for moving the arm 60 are provided on the differential apparatus 51. The interface apparatus 2 has the left holding target unit 2L for supporting the differential apparatus 51 and being held with the left upper limb by the user. The interface apparatus 2 includes the right holding target unit 2R disposed in a spaced relationship in the rightward direction from the left holding target unit 2L for being held with the right hand by the user. The right holding target unit 2R is connected to the arm 60, and change of the relative position with respect to the left holding target unit 2L is permitted by relative movement of the arm 60 with respect to the differential apparatus 51. With the interface apparatus 2, the user can use the interface apparatus 2 while both hands are moved in a space and the degree of freedom in the use mode can be increased.

It is to be noted that the present invention is not limited to the interface apparatus 1 and 2 described hereinabove and various alterations are possible.

For example, in the interface apparatus 1, the number of arms to be attached to fingers is not limited to two, but three or four arms may be provided. Further, the hand cover 41 may not necessarily be provided.

Further, in the interface apparatus 2, the operation portions 81u and 81d may not necessarily be provided. The interface apparatus 2 may include only one of the position changing mechanism M1 and the rotation permission mechanism M2.

The invention claimed is:

1. An interface apparatus comprising:
a first arm and a second arm mounted for opening and closing motion being attached to a thumb and a finger other than the thumb, respectively; and
a motor configured to exert force in opening and closing directions on the first arm and the second arm and include a motor main body supported to be rotatable and a rotary shaft that relatively rotates with respect to the motor main body, the rotary shaft being connected to one of the first arm and the second arm while an other one of the first and second arms and the motor main body are connected to each other so as to impart rotation of the motor main body to the other one of the arms;
wherein the first arm is rotatable around a first axis; and
the second arm is rotatable around a second axis positioned in a spaced relationship from the first axis.

2. An interface apparatus comprising:
a first arm and a second arm mounted for opening and closing motion being attached to a thumb and a finger other than the thumb, respectively; and
a motor configured to exert force in opening and closing directions on the first arm and the second arm and include a motor main body supported to be rotatable and a rotary shaft that relatively rotates with respect to the motor main body, the rotary shaft being connected to one of the first arm and the second arm while another one of the first and second arms and the motor main body are connected to each other so as to impart rotation of the motor main body to the other one of the arms; a first arm and a second arm mounted for opening and closing motion being attached to a thumb and a finger other than the thumb, respectively; and
a motor configured to exert force in opening and closing directions on the first arm and the second arm and include a motor main body supported to be rotatable and a rotary shaft that relatively rotates with respect to the motor main body, the rotary shaft being connected to one of the first arm and the second arm while an other one of the first and second arms and the motor main body are connected to each other so as to impart rotation of the motor main body to the other one of the arms;
wherein the motor is disposed in a posture in which the rotary shaft extends orthogonally to a plane on which the first arm and the second arm open or close.

3. The interface apparatus according to claim 2, wherein the motor is disposed between the first arm and the second arm.

4. The interface apparatus according to claim 3, further comprising:
a motor case configured to accommodate the motor main body therein and support the motor main body for rotation; and
a member positioned in a spaced relationship in a radial direction from the motor case and cooperating with the motor case to sandwich a hand of the user therebetween.

\* \* \* \* \*